US009401826B2

(12) United States Patent
Eitel et al.

(10) Patent No.: US 9,401,826 B2
(45) Date of Patent: Jul. 26, 2016

(54) SIGNAL PROCESSING UNIT EMPLOYING A BLIND CHANNEL ESTIMATION ALGORITHM AND METHOD OF OPERATING A RECEIVER APPARATUS

(71) Applicant: Sony Corporation, Tokyo (JP)

(72) Inventors: Ben Eitel, Gaertringen (DE); Julian Zinsser, Stuttgart (DE); Rana Ahmed Salem, Stuttgart (DE); Stefan Uhlich, Renningen (DE)

(73) Assignee: Sony Corporation, Tokyo (JP)

( * ) Notice: Subject to any disclaimer, the term of this patent is extended or adjusted under 35 U.S.C. 154(b) by 389 days.

(21) Appl. No.: 13/755,776

(22) Filed: Jan. 31, 2013

(65) Prior Publication Data

US 2013/0215945 A1  Aug. 22, 2013

(30) Foreign Application Priority Data

Feb. 17, 2012  (EP) .................................. 12001057
Feb. 17, 2012  (EP) .................................. 12001058

(51) Int. Cl.
*H04B 7/10* (2006.01)
*H04L 1/02* (2006.01)
*H04L 25/02* (2006.01)

(52) U.S. Cl.
CPC .......... *H04L 25/0238* (2013.01); *H04L 25/025* (2013.01); *H04L 25/0206* (2013.01)

(58) Field of Classification Search
CPC ................. H04L 2025/03426; H04L 25/0204; H04L 25/0242; H04L 25/0212; H04L 5/0023
USPC .................. 375/229–236, 259–285, 316–352
See application file for complete search history.

(56) References Cited

U.S. PATENT DOCUMENTS 5,937,014 A * 8/1999 Pelin ...................... H04B 1/707
375/340
6,223,040 B1 * 4/2001 Dam ..................... H04B 7/2693
370/337

(Continued)

OTHER PUBLICATIONS

Yiteng (Arden) Huang et al., A Class of Frequency-Domain Adaptive Approaches to Blind Multichannel Identification, IEEE Transactions on Signal Processing, vol. 51, No. 1, Jan. 2003, pp. 11-24.

(Continued)

*Primary Examiner* — James M Perez
(74) *Attorney, Agent, or Firm* — Oblon, McClelland, Maier & Neustadt, L.L.P.

(57) ABSTRACT

A receiver apparatus receives a transmit signal through a plurality of transmission channels, wherein each transmission channel is described by its channel vector. A sparseness evaluation unit (127) may obtain a sparseness measure containing sparseness information for previously estimated frequency-domain channel vectors. From the plurality of receive signals, an estimator unit (120) estimates updated channel vectors for the transmission channels by applying an iterative blind channel estimation algorithm that may consider a change of the sparseness measure, out-of-band energy information and/or signal-to-noise information and cross-relations between pairs of receive signals. A combining unit (130) may combine the receive signals on the basis of combining coefficients derived from the estimated channel impulse responses for a pre-selected diversity combining scheme to obtain a combined receive signal representing an estimation of the transmit signal. The receiver apparatus employs an improved blind channel estimation approach.

27 Claims, 8 Drawing Sheets

(56) References Cited

U.S. PATENT DOCUMENTS

| | | | |
|---|---|---|---|
| 6,694,155 B1* | 2/2004 | Chin | H04B 7/0615 455/561 |
| 6,947,373 B2* | 9/2005 | Siala | H04L 1/06 370/208 |
| 6,990,153 B1* | 1/2006 | Farhang-Boroujeni | H04L 25/0212 375/260 |
| 7,006,554 B2* | 2/2006 | Sun | H04L 1/0001 370/342 |
| 7,054,354 B2* | 5/2006 | Gorokhov | H04L 25/03159 375/148 |
| 7,224,744 B2* | 5/2007 | Giannakis | H04L 1/0054 375/267 |
| 7,555,060 B2* | 6/2009 | Raleigh | H04B 7/0615 375/260 |
| 7,633,849 B1* | 12/2009 | Al-Rawi | H04L 25/0228 370/208 |
| 7,903,617 B2* | 3/2011 | Liu | H04B 1/126 370/335 |
| 8,045,661 B2* | 10/2011 | Ikram | H04L 25/03006 375/260 |
| 8,358,684 B2* | 1/2013 | Takaoka | H04L 25/03044 375/231 |
| 8,380,154 B2* | 2/2013 | Lindqvist | H04B 7/0854 375/316 |
| 8,830,907 B2* | 9/2014 | Melis | H04B 1/71055 370/328 |
| 2002/0122465 A1* | 9/2002 | Agee | H04B 1/69 375/141 |
| 2002/0131386 A1* | 9/2002 | Gwon | H04W 36/0011 370/338 |
| 2002/0146063 A1* | 10/2002 | Gorokhov | H04L 25/03159 375/148 |
| 2003/0016645 A1* | 1/2003 | Siala | H04L 1/06 370/342 |
| 2003/0016815 A1* | 1/2003 | Kurtz | H04B 3/23 379/406.01 |
| 2003/0053525 A1* | 3/2003 | Mehrabani | H04B 1/7115 375/148 |
| 2004/0008614 A1* | 1/2004 | Matsuoka | H04B 7/082 370/203 |
| 2004/0076112 A1* | 4/2004 | Chen | H04L 25/022 370/208 |
| 2004/0081074 A1* | 4/2004 | Piechocki | H04L 1/0618 370/206 |
| 2004/0091057 A1* | 5/2004 | Yoshida | H04L 25/03146 375/260 |
| 2004/0223480 A1* | 11/2004 | Nguyen | H04B 1/707 370/342 |
| 2005/0009476 A1* | 1/2005 | Wu | H04B 7/0413 455/101 |
| 2006/0013340 A1* | 1/2006 | Reid | H04L 25/022 375/340 |
| 2006/0093065 A1* | 5/2006 | Thomas | H04B 7/0426 375/299 |
| 2006/0268962 A1* | 11/2006 | Cairns | H04B 1/712 375/148 |
| 2007/0133700 A1* | 6/2007 | Kim | H04L 25/0238 375/260 |
| 2007/0183517 A1* | 8/2007 | Liu | H04L 25/03171 375/260 |
| 2007/0253476 A1* | 11/2007 | Tirkkonen | H04L 1/06 375/230 |
| 2007/0286312 A1* | 12/2007 | Kim | H04L 25/0204 375/340 |
| 2008/0095121 A1* | 4/2008 | Shattil | H04J 13/0003 370/335 |
| 2008/0165672 A1* | 7/2008 | Ku | H04L 1/0643 370/208 |
| 2008/0274727 A1* | 11/2008 | Axnas | H04B 1/7103 455/423 |
| 2009/0116568 A1* | 5/2009 | Lindoff | H04B 7/086 375/260 |
| 2009/0190642 A1* | 7/2009 | Brueninghaus | H04B 1/7077 375/224 |
| 2009/0268800 A1* | 10/2009 | Takaoka | H04L 25/03044 375/232 |
| 2010/0067366 A1* | 3/2010 | Nicoli | H04B 7/0417 370/210 |
| 2010/0067563 A1* | 3/2010 | Wang | H04B 1/7097 375/144 |
| 2012/0108194 A1* | 5/2012 | Lindqvist | H04B 7/0854 455/296 |
| 2012/0281280 A1* | 11/2012 | Buehler | G02B 5/3083 359/489.01 |
| 2013/0102254 A1* | 4/2013 | Cyzs | H04B 1/126 455/63.1 |
| 2013/0215945 A1* | 8/2013 | Eitel et al. | 375/224 |

OTHER PUBLICATIONS

Pradeep Loganathan, "Sparseness-Controlled Adaptive Algorithms for Supervised and Unsupervised System Identification", Imperial College, London, Apr. 2011, pp. 1-168.

Abdeldjalil Aissa-El-Bey et al., "Blind SIMO Channel Identification Using a Sparsity Criterion", Proc. $9^{th}$ IEEE Workshop on Signal Processing Advances for Wireless Communications SPAWC, Jul. 2008, Refice, Brazil, pp. 271-275.

Nikolay D. Gaubitch et al., "Generalized Optimal Step-Size for Blind Multichannel LMS System Identification", IEEE Signal Processing Letters, vol. 13, No. 10, Oct. 2006, pp. 624-627.

Lang Tong et al., "Multichannel Blind Identification: From Subspace to Maximum Likelihood Methods", Proc. of the IEEE, vol. 86, No. 10, Oct. 1998, pp. 1951-1968.

Romed Schur et al., "An Efficient Equalization Method to Minimize Delay Spread in OFDM/DMT Systems", IEEE, © 2001, pp. 1481-1485.

Mohammad Ariful Haque et al., "Performance Comparison of the Blind Multi Channel Frequency Domain Normalized LMS and Variable Step-Size LMS with Noise", $15^{th}$ European Signal Processing Conference (EUSIPCO 2007), Poznan, Poland, Sep. 3-7, 2007, pp. 213-217.

Kamrul Hasan, "Damped Variable Step Size Multichannel Wiener LMS Algorithm for Blind Channel Identification with Noise", Proc. of $5^{th}$ International Symposium on Communication Systems, Networks and Digital Signal Processing (CSNDSO 2006), Jul. 19-21, 2006, Patras, Greece, pp. 374-377.

Arun Batra et al., "A Two-Stage Approach for Improving the Convergence of Lease-Mean-Square Adaptive Decision-Feedback Equalizers in the Presence of Severe Narrowband Interference", EURASIP Journal on Advance in Signal Processing, vol. 2008, Article ID 390102, 2008, 19 Pages.

Athanasios A. Rontogiannis et al., "Bandwidth Efficient Transmission Through Sparse Channels Using a Parametric Channel Estimation—based DFE", Institute of Space Applications and Remote Sensing, National Observatory of Athens, 15236, Athens, Greece, Dept. of Computer Engineering & Informatics / C.T.I-R&D, University of Patras, 26500, Rio, Greece, Jul. 5, 2004, pp. 1-22.

Mohammad Ariful Haque et al., "Variable Step Size Frequency Domain Multichannel LMS Algorithm for Blind Channel Identification with Noise", Proc. of $5^{th}$ International Symposium on Communication Systems, Networks and Digital Signal Processing (CSNDSP 2006), Jul. 19-21, 2009, Patras, Greece, 4 Pages.

Maarit Melvasalo, "Advanced Receivers for High Data Rate Mobile Communications", Helsinki University of Technology Signal Processing Laboratory, Espoo 2006, Report 57, Dec. 8, 2006, 104 Pages.

Anna Scaglione et al., "Redundant Filterbank Precoders and Equalizers Part II: Blind Channel Estimation, Synchronization, and Direct Equalization", IEEE Transactions on Signal Processing, vol. 47, No. 7, Jul. 1999, pp. 2007-2022.

Lang Tong et al., "Blind Identification and Equalization Based on Second-Order Statistics: A Time Domain Approach", IEEE Transactions on Information Theory, vol. 40, No. 2, Mar. 1994, pp. 340-349.

* cited by examiner

US 9,401,826 B2

SIGNAL PROCESSING UNIT EMPLOYING A BLIND CHANNEL ESTIMATION ALGORITHM AND METHOD OF OPERATING A RECEIVER APPARATUS

FIELD OF THE DISCLOSURE

Embodiments of the disclosure refer to a signal processing unit employing diversity combining. Other embodiments refer to a method of operating a receiver apparatus of an electronic device.

DESCRIPTION OF THE RELATED ART

Electronic devices may be provided with multiple receive antennas to realize diversity combining, for example EGC (equal gain combining), MRC (maximum ratio combining), or an SC (selection combining) approach like SSC (switch and stay combining). Diversity combining relies on channel state information describing the transmission properties of each transmission channel. Knowledge of the amplitude and/or phase information of each transmission channel is obtained from demodulated receive signals, for example by comparing training symbols contained in the receive signals with reference information available at the receiver side, for example reference signals.

SUMMARY

The object of the present disclosure is providing a cost-effective signal processing unit employing diversity combining.

According to an aspect, a signal processing unit is provided which comprises an estimator unit configured to estimate, from a plurality of receive signals, frequency-domain channel vectors of transmission channels on the basis of an iterative blind channel estimation algorithm, which exploits cross-relations between pairs of receive signals and which is modified by a term considering a change in a sparseness measure obtained from the estimated frequency-domain channel vectors. Each receive signal is assigned to another one of the transmission channels and originates from the same transmit signal.

According to a further aspect, a method of operating a receiver apparatus is provided, the method comprising obtaining, on the basis of previous estimated frequency-domain channel vectors, a sparseness measure containing information descriptive for a sparseness of the estimated frequency-domain channel vectors; and estimating, using an estimator unit, from a plurality of receive signals current frequency-domain channel vectors of transmission channels on the basis of an iterative blind channel estimation algorithm exploiting cross-relations between pairs of receive signals. The iterative blind channel estimation algorithm is modified on the basis of a change of the sparseness measure obtained from the estimated frequency-domain channel vectors, and each receive signal is assigned to another one of the transmission channels and originates from the same transmit signal.

According to a further aspect, a signal processing unit is provided which comprises an estimator unit configured to estimate, from a plurality of receive signals, frequency-domain channel vectors of transmission channels on the basis of an iterative blind channel estimation algorithm exploiting cross-relations between pairs of receive signals, wherein each receive signal is assigned to another one of the transmission channels and originates from the same transmit signal, a detecting unit configured to detect, on the basis of the frequency-domain channel vectors a misconvergence behaviour of the blind channel estimation algorithm or an excess condition for out-of-band energy in a frequency range between an upper frequency limit of the receive signal and a sample frequency and to output a control signal indicating a misconvergence behaviour or an excess condition, and a power limiting unit configured to limit a signal energy in frequency band edge areas of the frequency-domain channel vectors in response to the control signal, wherein the iterative blind channel estimation algorithm proceeds with the energy-limited estimated frequency-domain channel vectors.

According to a further aspect, a signal processing unit is provided which comprises an estimator unit configured to estimate, from a plurality of receive signals, frequency-domain channel vectors of transmission channels on the basis of a blind channel estimation algorithm exploiting cross-relations between pairs of receive signals, wherein each receive signal is assigned to another one of the transmission channels and originates from the same transmit signal, and an SNR unit configured to output SNR information descriptive for current signal-to-noise ratio values of the channels on the basis of the values of a cost function minimized by the blind channel estimation algorithm.

DETAILED DESCRIPTION

In the following, embodiments of the disclosure are described. The described embodiments may be combined in any way, i.e. there is no limitation that certain described embodiments may not be combined with others. Throughout the Figures, the same reference sign denotes same or similar elements. Other embodiments may be utilized and structural or logical changes may be made without departing from the scope of the disclosure. The following detailed description thereof is not to be taken in a limiting sense, and the scope of the present disclosure is defined by the appended claims.

Figure 1:
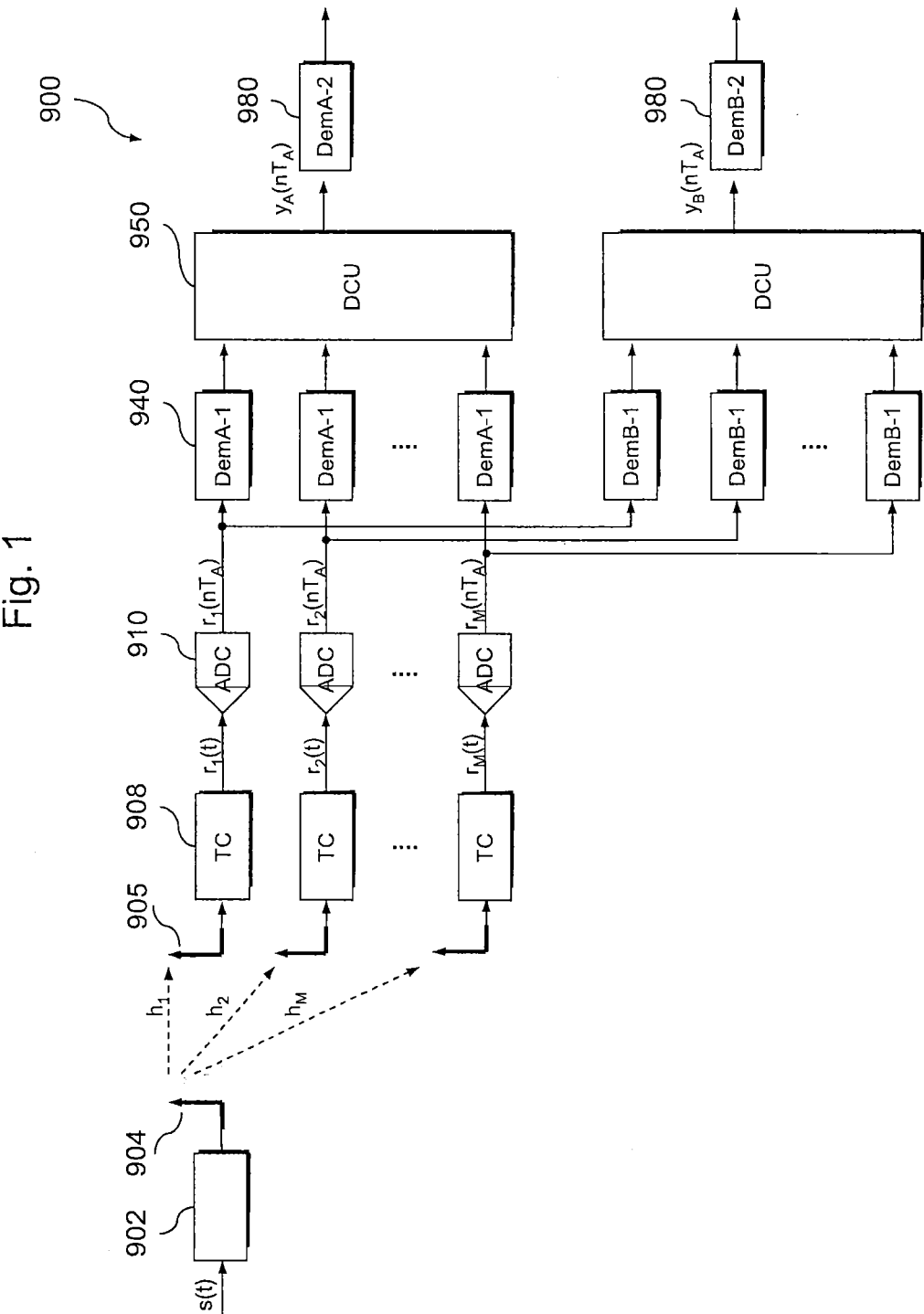
FIG. 1 is a schematic block diagram of a receiver apparatus employing diversity combining for discussing background information usable for understanding the disclosure.

FIG. 1 serves to provide an understanding of the background of the embodiments. Assumed a broadcast station 902 modulates a transmit signal s(t) on a carrier signal and transmits the modulated signal over a transmitter antenna 904, then a receiver apparatus 900 employing diversity combining receives the modulated signal on a plurality of M receiving elements 905, e.g. antennas, wherein each receiving element 905 is connected to one of M tuner circuits 908. The tuner circuits 908 tune in to the same channel or carrier signal via which the broadcast station 902 transmits the transmit signal s(t). Each of the M receiving elements 905 and tuner circuits 908 receives the transmit signal s(t) via a separate transmission channel. Each transmission channel is described by its channel impulse response $h_i(t)$, with $i=1, 2 \ldots, M$. Each tuner circuit 908 is assigned to a receive path and outputs an analogue receive signal $r_i(t)$, wherein each analogue receive signal $r_i(t)$ is assigned to one of the M transmission channels. With $n_i(t)$ representing noise on the respective transmission channel and in the respective tuner circuit 908, equation (1) describes each receive signal $r_i(t)$ as a function of the transmit signal s(t), the respective channel transfer function $h_i(t)$ and the respective additive channel noise $n_i(t)$ for a time-variant transmission channel:

$$r_i(t)=s(t)*h_i(t)+n_i(t) \quad (1)$$

In each receive path, an A/D (analogue/digital) converter unit 910 samples the analogue receive signal $r_i(t)$ to obtain digital (sampled) receive signals $r_i(n \cdot T_A)$. In each receive path a first demodulator 940 synchronizes in time and frequency with the respective sampled receive signal $r_i(n \cdot T_A)$ and extracts training signals (pilots) to obtain channel information about the respective transmission channel. For example, each first demodulator 940 obtains an estimation for the respective channel impulse response $h_i(t)$ by comparing the extracted training symbols with reference symbols available at the receiver side. For each receive signal $r_i(t)$, different transmission schemes require different types DEMA-1, DEMB-1 of first demodulators 140.

On the basis of the knowledge of the channel impulse responses $h_i(n \cdot T_A)$, a diversity combining unit 950 determines a set (vector) of combining coefficients $\vec{c}_i$ for each sampled receive signal $r_i(n \cdot T_A)$. The diversity combining unit 950 uses the combining coefficients $\vec{c}_i$ to weight or filter the sampled receive signals $r_i(n \cdot T_A)$ or signals derived therefrom and then combines the weighted or filtered receive signals with each other to obtain combined receive signals $y_A(n \cdot T_A)$, $y_B(n \cdot T_A)$ which represent estimates of the transmit signal s(t). Different transmission schemes may require different types of diversity combining units 950.

Second demodulators 980 may synchronize with the combined receive signal $y_A(n \cdot T_A)$, $y_B(n \cdot T_A)$ and demodulate a payload portion of the combined receive signals $y_A(n \cdot T_A)$, $y_B(n \cdot T_A)$. For example, the second demodulator 980 provides demapping and decoding according to a transmission scheme or transmission standard used by the broadcast station 902. The second demodulator 980 may include further sub-units for bit error correction and sub-units specific for a transmission standard the broadcast station 902 applies. Different transmission schemes may require different types DEMA-2, DEMB-2 of second demodulators 980.

The way the diversity combining unit 950 determines the combining coefficients $\vec{c}_i$ on the basis of the respective receive signal $r_i(n \cdot T_A)$ depends on the specific combining technique. For example, for MRC approaches the estimated coefficients $\vec{c}_i$ depend on the respective SNR (signal-to-noise ratio). With EGC the receive signals are adjusted in phase before they are summed up with the same gain. For SC one of the receive signals, for example the one with the best SNR, may be selected as the signal representing the best estimation for the transmit signal s(t). For SSC a previously selected receive signal is maintained as the best estimation until its SNR falls below a predefined threshold.

Provided that the channel impulse responses $h_i(t)$ are known at the receiver side, and with the assumptions that the receive signal is disturbed by additive White Gaussian noise $n_i(t)$ with zero mean and that $n_i(t)$ and $n_k(t)$ are generally statistically independent for $i \neq k$, in other words $E[n_i(t) \cdot n_k(t)]=E[n_i(t)] E[n_k(t)]=0$, for MRC the combining coefficients $\vec{c}_i$ may be determined according to equation (2a):

$$(MRC)= \vec{c}_i = \vec{h}_i{}^* \quad (2a)$$

The resulting combined receive signal y(t) is given by equation (2b).

$$(MRC): y(t)=\Sigma_{i=1}^{N}(|\vec{h}_i|^2 s(t)+\vec{h}_i{}^* n_i(t)) \quad (2b)$$

For EGC, equation (3a) gives the estimated coefficients $\vec{c}_i$ and equation (3b) gives the combined receive signal y(t), wherein in equation (3a) the term $e^{-j\Theta_i}$ is a vector:

$$(EGC): \vec{c}_i = e^{j\Theta_i} \quad (3a)$$

$$(EGC): y(t)=\Sigma_{i=1}^{N}(|\vec{h}_i|s(t)+e^{-j\Theta_i}n_i(t)) \quad (3b)$$

Equations (2a) and (3a) illustrate that the calculation of the combing coefficients $\vec{c}_i$ requires knowledge of the respective channel impulse response $h_i(t)$. But conventionally, the channel impulse response $h_i(t)$ was obtained by demodulation of at least the part of each receive signal containing the training symbols. Accordingly, each receive signal is demodulated at least partly before the signals can be combined.

Figure 2A:
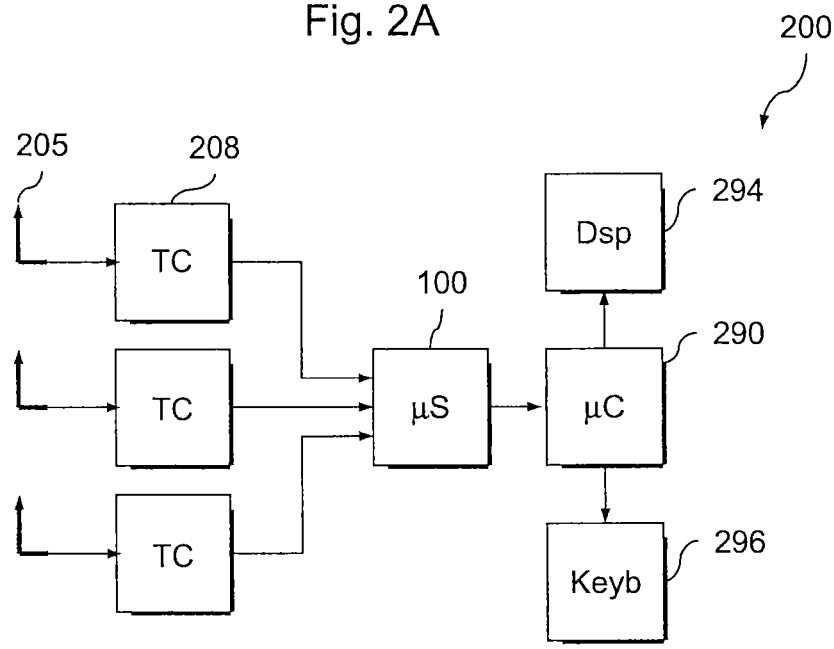
FIG. 2A is a schematic block diagram of an electronic device including a plurality of tuner circuits according to an embodiment related to wireless communications systems.

FIG. 2A refers to an embodiment of the disclosure related to wireless communication systems and illustrates an electronic device 200 for receiving individual communication data, for example telephone calls, or broadcast data, for example television programs or radio programs. The electronic device 200 may be a stationary device, for example a radio apparatus, a television set, a set-top box or computer equipment with radio or television receiver capabilities. According to another embodiment, the electronic device 200 is a mobile device, for example a cellular phone, a personal digital assistant, a mobile radio or a portable television apparatus, wherein the mobile device may be a handheld device or a device mountable in/on a vehicle. The electronic device 200 may include a plurality of appropriately spaced antennas for receiving electromagnetic radiation as receiving elements 205. The antennas may be arranged on different surfaces or in different sections of the electronic device 200. In general it suffices that the distance between two antennas is greater than half of the wavelength used for transmission in order to ensure that the receive signals have passed independent transmission channels.

Each receiving element 205 may be connected to one of a plurality of tuner circuits 208, wherein the tuner circuits 208 are configured to tune in to the same broadcast channel, for example to the same carrier frequency, simultaneously. Each tuner circuit 208 outputs a receive signal. A signal processing unit 100 analyzes the receive signals on the basis of a blind channel estimation approach to estimate channel impulse responses, wherein the signal processing unit 100 considers a change of a sparseness measure containing channel sparseness information and/or limits signal power in frequency band edge areas and/or outputs an estimated SNR (signal-to-noise ratio). According to an embodiment, the signal processing unit 100 weights or filters the receive signals according to the results of the estimation, and superposes the weighted or filtered receive signals to obtain a combined receive signal that is an estimation of the original transmit signal. Further, the signal processing unit 100 may provide pre-equalizing of the combined receive signal using information obtained from the blind channel estimation. Finally, the signal processing unit 100 demodulates the combined or pre-equalized receive signal.

Accordingly, the receiver architecture of the embodiments provides first combining the receive signals and then demodulating the combined receive signal. While the signal processing unit of FIG. 1, when coping with different transmission standards using different demodulation schemes, requires one instance of the first demodulator unit for each receive path and for each transmission standard, for the receiver architecture of the embodiments only one single instance of a demodulator unit for each transmission standard suffices.

The signal processing unit 100 includes an estimator unit. Using a blind channel estimation algorithm, the estimator unit may estimate the channel impulse responses and obtains estimated channel impulse responses $\hat{\vec{h}}_i$ on the basis of all sampled receive signals for each of the receive paths, wherein the estimator unit may consider a channel sparseness measure, an out-of-band energy, and/or an estimated SNR. For example, the estimator unit may limit out-of-band energy in an iterative blind channel estimation algorithm. The blind channel estimation is applied before demodulation of the receive signals.

According to an embodiment, each estimated impulse response $\hat{\vec{h}}_i$ is computed on the basis of sample values of time-domain instances of the sampled receive signals and a cost function defined in the time domain. According to another embodiment, each estimated impulse response $\hat{\vec{h}}_i$ is computed on the basis of a cost function defined in the frequency-domain.

The signal processing unit 100 further includes a combining unit that combines the receive signals on the basis of the estimated impulse responses $\hat{\vec{h}}_i$ obtained by the blind channel estimation. According to an embodiment, the estimated impulse responses $\hat{\vec{h}}_i$ are used to configure a matched filter for each receive path, wherein each matched filter matches the transmission channel assigned to the respective receive path. The combining unit may or may not pre-equalize the combined signal on the basis of information obtained by the blind channel estimation and forwards the combined or the pre-equalized receive signal representing an estimation of the transmit signal s(t) to a demodulator unit. The demodulator unit may include a further equalizer unit that may exploit information contained in the transmit signal to eliminate distortions introduced by the transmission channels and the combiner unit. The signal processing unit 100 may output the demodulated signal to a control unit 290.

The control unit 290 may control an output device 294 to output information encoded in the demodulated signal. For example, the output unit 294 may be a screen displaying a television program encoded in the transmit signal s(t). According to another embodiment, the output unit 294 outputs audio information encoded in the transmit signal s(t). The electronic device 200 may further include an input unit 296, for example a keypad or a sensor array applied to the output unit 294 for allowing a user to control the electronic device 200.

Figure 2B:
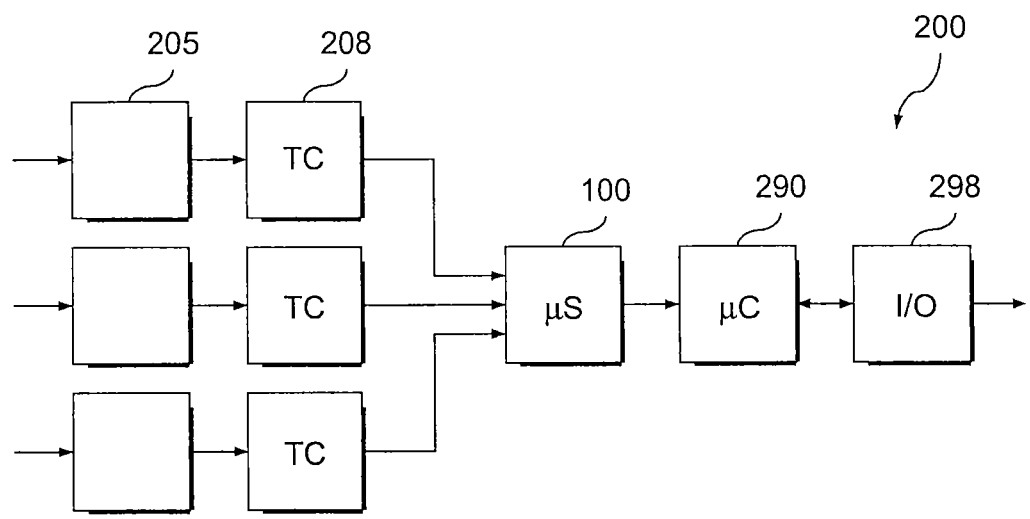
FIG. 2B is a schematic block diagram of an electronic device including a plurality of tuner circuits according to an embodiment related to wired communications systems.

FIG. 2B refers to an embodiment of an electronic device 200 for a wired communication system using a single-input-multiple-output (SIMO) or a multiple-input-multiple output (MIMO) approach, for example DSL (digital subscriber line) or PLC (power line communications). The receiving elements 205 may be terminals of a connector block receiving, by way of example, one, two or three life wires, a neutral wire and/or an earth wire of a power line network. Tuner circuits 208 may tune in to the same carrier frequency and supply receive signals $r_i(t)$ to a signal processing unit 100. The signal processing unit 100 performs a blind channel estimation for obtaining channel information. The signal processing unit 100 may apply diversity combining to obtain a coarse estimation of the transmitted signal on the basis of the results of the blind channel estimation, may or may not pre-equalize the combined signal on the basis of information obtained by the blind channel estimation, demodulates the combined or pre-equalized signal, and outputs the demodulated signal to a control unit 290. The control unit 290 may process the demodulated signal and an interface unit 298 may output the processed signal.

Figure 3A:
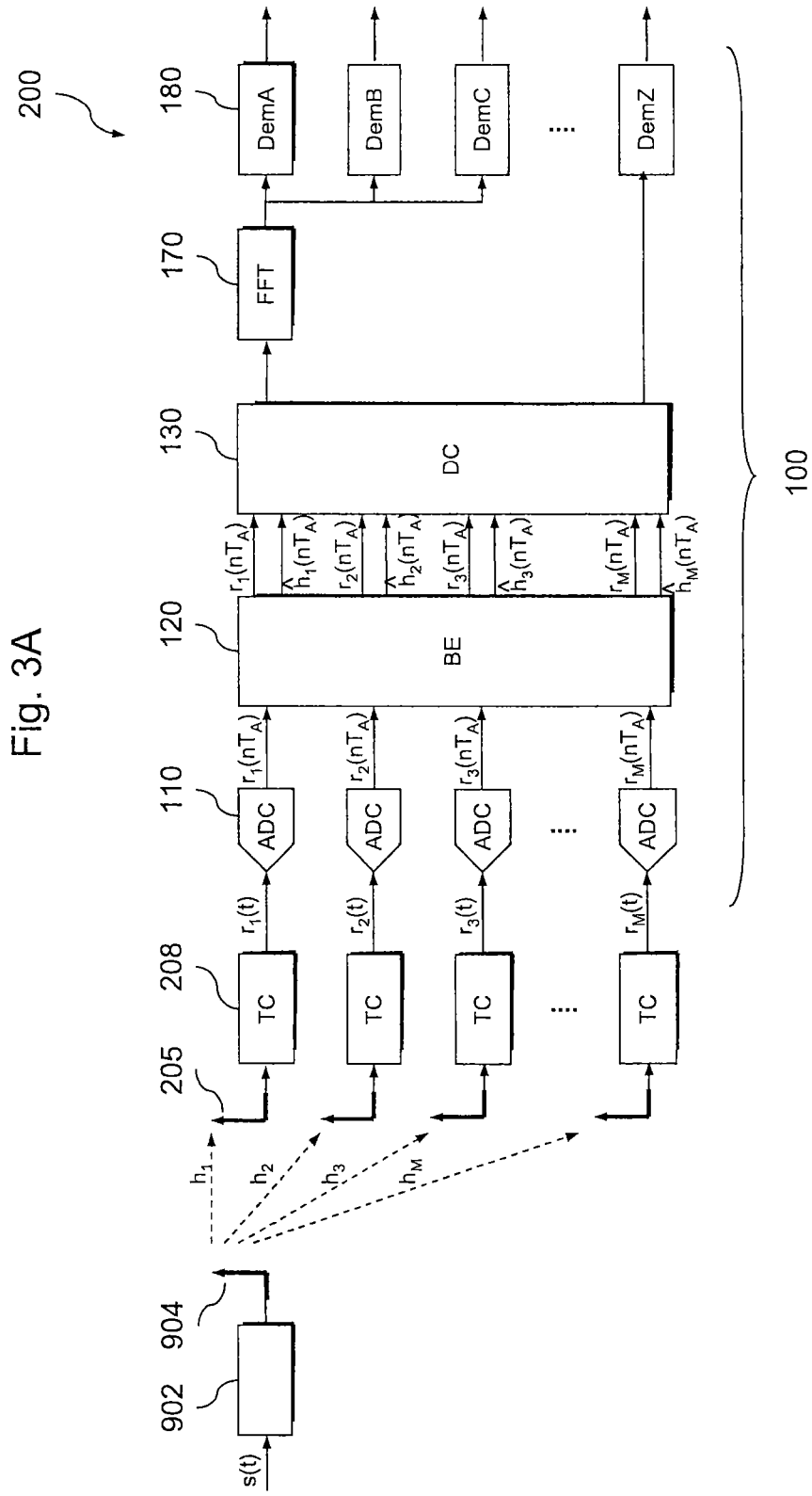
FIG. 3A is a schematic block diagram of a receiver apparatus employing diversity combining in accordance with an embodiment.

FIG. 3A shows details of a signal processing unit 100 being integrated in a receiver apparatus of an electronic device 200, e. g. in a television receiver. The receiver apparatus includes receiving elements 205 and tuner circuits 208. The signal processor unit 100 may include a plurality of A/D converter units 110, wherein each A/D converter unit 110 samples the respective analogue receive signal $r_i(t)$ at a predefined sample rate $1/T_A$. From the sampled receive signals $r_i(n \cdot T_A)$, an estimator unit 120 derives the estimated impulse response $\hat{\vec{h}}_i$ for each sampled receive signal $r_i(n \cdot T_A)$, wherein the estimator unit 120 may adapt an iterative blind channel estimation algorithm according to a sparseness measure obtained by the estimates. A combining unit 130 combines the sampled receive signals $r_i(n \cdot T_A)$ or signals derived therefrom on the basis of combining coefficients derived from the estimated impulse responses $\hat{\vec{h}}_i$ to obtain one combined receive signal $y(n \cdot T_A)$, which is an estimate of a transmit signal s(t) transmitted via the plurality of transmission channels.

One or more demodulator units 180 of different types DEMA, DEMB, . . . may synchronize and demodulate the combined receive signal $y(n \cdot T_A)$ by multiplying the combined receive signal $y(n \cdot T_A)$ with an analyzing signal having a demodulator frequency. One or more of the demodulator units 180 may use the combined receive signal $y(n \cdot T_A)$ in the time domain. According to an embodiment, at least one of the demodulator units 180 uses a frequency domain representation of the combined receive signal $y(n \cdot T_A)$. Then a transformation unit 170 may be provided in a signal path between the combining unit 130 and the demodulator units 180 using the frequency domain representation. The transformation unit may apply a DFT (discrete Fourier transform) to the combined receive signal to obtain a corresponding description of the combined receive signal in the frequency domain.

One or more of the demodulator units 180 may be configured to demodulate analogue television broadcast signals following different television broadcast standards, other demodulator units 180 may be adapted to demodulate digital television broadcast signals, digital radio broadcast signals or analogue radio broadcast signals. According to an embodiment, at least one of the demodulator units 180 may include a quadrature demodulator, or an OFDM (orthogonal frequency division multiplexing) demodulator. One or more of the demodulator units 180 may further modify the demodulated receive signal using information encoded in the receive signal. The demodulator units 180 may include bit error correction units using bit error detection and correction approaches to correct bit errors in the digital data stream.

As regards the estimator unit 120, the idea may be a blind diversity combining approach deriving the combining coefficients $\vec{c}_i$ for the receive signal $r_i(t)$ from a blind channel estimation of the respective channel impulse response $h_i(t)$, wherein a blind channel estimation algorithm is modified according to sparseness information about the estimation results, wherein the sparseness information contains information about a change of a sparseness measure. Remarkably, though blind channel estimation algorithms contain at least a scalar ambiguity in their estimates, diversity combining can still be applied at a profit: As the inventors could show, diversity combining (even MRC) is robust against the kind of scalar ambiguity introduced by the blind channel estimation algorithm. Hence, other than in conventional approaches where determination of the channel impulse response depends on knowledge about the structure of the transmitted signal (e. g. about whether the signal is an OFDM signal etc.) and/or about a training sequence in the transmitted signal and typically requires exact time, frequency and sample clock synchronization before reference or training symbols can be identified and used for channel estimation, blind diversity combining as proposed herein neither requires frequency nor sample clock synchronization before the combining step.

Instead, blind diversity combining exploits cross-relation statistics between the receive signals and uses not-demodulated instances of the receive signals. The blind diversity combining may be based on higher order statistics cross relations. According to an embodiment, the blind diversity combining uses second-order statistics cross relations. According to further embodiments, the blind diversity combining does not rely on knowledge on the type of modulation applied to obtain the transmit signal and on the type of demodulation required to demodulate the receive signal. Where conventional approaches which consider individual channel transfer functions have to instantiate a demodulator unit employing demodulation and synchronization for each of the receive paths, the blind channel estimation requires this portion of the demodulator unit only once for the combined receive signal. Where systems contain several types of demodulators, each type dedicated to another communication system technology or communication standard, blind diversity combining allows instantiating only one single demodulator for each communication system or communication standard respectively. As a result, in a MIMO (multiple-input-multiple-output) or SIMO (single-input-multiple-output) communication system blind diversity combining reduces costs for diversity receivers significantly.

Figure 3B:
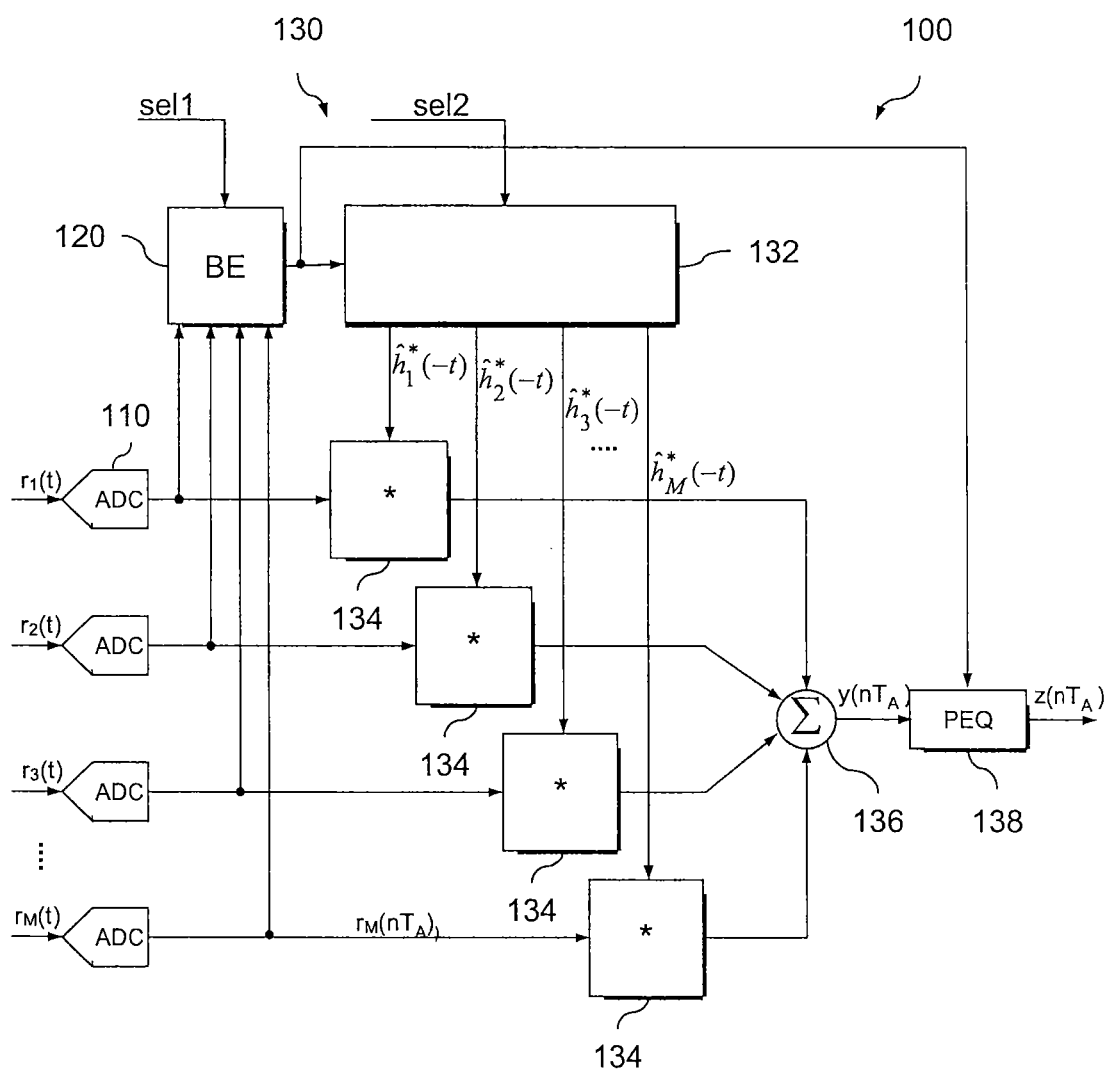
FIG. 3B is a schematic block diagram showing details of an embodiment of the signal processing unit of the receiver apparatus of FIG. 3A.

FIG. 3B shows details of the estimator unit 120 and the combining unit 130 of a signal processor unit 100 according to an embodiment applying a blind channel estimation based on a cost function defined in the time domain in combination with MRC. The estimator unit 120 receives the sampled receive signals $r_i(n \cdot T_A)$. According to an embodiment, the estimator unit 120 applies the MCLMS (multi-channel least mean squares) approach.

The MCLMS approach relies on the observation that in the absence of noise for each pair of receive signals equation (4) holds:

$$r_i(t)*h_j(t)=r_j(t)*h_i(t) \quad (4)$$

The observed deviation from this assumption is considered to represent an error signal as regards the cross-relation between the receive signals i and j. From the error signals of all pairs of sampled receive signals $r_i(n \cdot T_A)$ a cost function is defined. The cost function includes a cross-relation matrix containing information about the cross relations between all pairs of receive signals. An iterative approach for an estimation of the channel impulse responses $h_i(n \cdot T_A)$ obtains updated values $h_i((a+1) \cdot T_A)$ on the basis of previously obtained values $h_i((a) \cdot T_A)$, the updated error signals and the updated cross-relation matrix. According to another embodiment, a MCN (multi-channel Newton) algorithm may be applied to accelerate the convergence of the algorithm. In accordance with further embodiments, the estimator unit 120 instantiates a plurality of different blind channel estimation algorithms and may select the current blind channel estimation algorithm according to an internal state or in response to a first selection signal sel1. The estimator unit 120 continuously outputs the results of the estimation, e.g. the estimated channel impulse responses $\hat{\vec{h}}_i$, to a control unit 132.

Based on the estimated impulse responses $\hat{\vec{h}}_i$ and the predefined or currently selected combining scheme, the control unit 132 may continuously update filter coefficients of filter units 134 provided in the signal path of the sampled receive signals. The control unit 132 may be programmable and may switch between MRC, EGC and SC upon an appropriate second selection signal sel2 or in response to a change of an internal state. According to an embodiment providing SC, the control unit 132 configures a filter unit 134 arranged in the signal path of the receive signal which has been identified as the least disturbed receive signal by the estimated impulse responses $\hat{\vec{h}}_i$ to let the least disturbed receive signal pass, whereas all other filter units 134 are configured to block the other receive signals.

According to an embodiment applying MRC, the control unit 132 derives combining coefficients that configure the filter units 134 to represent matched filters which match with the respective estimated transmission channel respectively. Each filter unit 134 convolves the respective receive signal with the respective matched filter function.

A superposing unit 136 adds up or superposes the filtered or weighted receive signals to generate the combined receive signal $y(n \cdot T_A)$ representing an estimation of the transmit signal.

The signal processing unit 130 may further comprise a pre-equalizer unit 138 which equalizes the combined receive signal and which outputs a pre-equalized signal $z(n \cdot T_A)$. The pre-equalizer unit 138 may use information obtained from the blind channel estimation algorithm. Applying blind diversity selection, the combined receive signal may have approximately twice the length of the longest channel impulse response. This would directly increase the required order of an equalizer that is effective in the following demodulator stage. In OFDM systems a guard interval violation could occur. According to an embodiment, the pre-equalizer unit 138 applies a delay spread minimization algorithm. According to another embodiment, the pre-equalizer unit 138 is designed to mitigate fast time-variant channel effects such as inter-carrier interference in a subsequent OFDM demodulator. Pre-equalizing is performed before demodulation of the combined receive signal. Pre-equalizing may be performed before or after Fourier transforming the combined receive signal into the frequency domain.

According to an embodiment providing the MCLMS approach, the estimator unit 120 estimates channel impulse responses using only second-order statistics of the receive signals $r_i(t)$ in the time domain. For example, the estimator unit 120 applies a cross-relation approach minimizing an error function derived from cross-relation information concerning pairs $r_i(t)$, $r_j(t)$ of receive signals respectively. In the absence of noise, equation (1) can be rewritten as indicated in equation (5):

$$r_i * h_j = s * h_i * h_j = r_j * h_i;\ i,j=1,2,\ldots,M; i \neq j \tag{5}$$

Equation (6) reflects equation (5) in vector form:

$$\vec{r}_i^T(n)\vec{h}_j(n) = \vec{r}_j^T(n)\vec{h}_i(n) \tag{6}$$

With L defining the maximum length (channel order) of the channel impulse responses, equation (6a) gives a channel impulse response vector $\vec{h}_i(n)$ for channel i:

$$\vec{h}_i(n) = [h_{i,0}(n) h_{i,1}(n) \ldots h_{i,L-1}(n)]^T \tag{6a}$$

In the presence of noise, the terms on both sides of equation (6) differ from each other. According to an embodiment, the difference defines an error signal $e_{ij}(n)$ between the two channels i and j:

$$e_{ij}(n) = \begin{cases} \vec{r}_i^T(n)\vec{h}_j - \vec{r}_j^T(n)\vec{h}_i, & i \neq j,\ i,j=1,2,\ldots,M \\ 0, & i = j,\ i,j=1,2,\ldots,M \end{cases} \tag{7}$$

From the error signals $e_{ij}(n)$, a cost function may be derived that considers all error signals $e_{ij}(n)$. Equation (8) gives an example for a cost function in accordance with an embodiment that is based on all error signals $e_{ij}(n)$ between each pair of the receive signals:

$$J(n) = \sum_{i=1}^{M-1} \sum_{j=i+1}^{M} e_{ij}^2(n) \tag{8}$$

Other embodiments may rely on differently defined error signals or on other derivatives of the error signals $e_{ij}(n)$. An estimate $\hat{\vec{h}}$ of channel impulse response vectors $\vec{h}$ aims at minimizing the cost function $J(n)$ according to equation (9):

$$\hat{\vec{h}} = \arg\min_{\vec{h}} E\{J(n)\} \tag{9}$$

subject to $\|\hat{\vec{h}}\| = 1$, wherein $\|\hat{\vec{h}}\|$ represents the magnitude norm of the estimated channel impulse response vectors. Calculation of the estimated channel impulse response vectors $\hat{\vec{h}}$ may rely on the observation that the vector $\vec{h}$ of channel impulse responses lies in the null space of a matrix R whose entries include autocorrelation and cross-correlation information about the receive signals $r_i(t)$ as given in equation (10):

$$R\vec{h} = 0 \tag{10}$$

The matrix R is given by the mathematical expectation values $R_{r_i r_j}$ of two receive signals $r_i(t)$ and $r_j(t)$, respectively:

$$R = \begin{bmatrix} \sum_{i \neq 1} R_{r_i r_i} & -R_{r_2 r_1} & \cdots & -R_{r_M r_1} \\ -R_{r_1 r_2} & \sum_{i \neq 2} R_{r_i r_i} & \cdots & -R_{r_M r_2} \\ \vdots & \vdots & \ddots & \vdots \\ -R_{r_1 r_M} & -R_{r_2 r_M} & \cdots & \sum_{i \neq M} R_{r_i r_i} \end{bmatrix} \tag{10a}$$

$$R_{r_i r_j} = E\{\vec{r}_i(n) \vec{r}_j^H(n)\}\ i,j = 1,2,\ldots,M \tag{10b}$$

$$\vec{h} = [h_1^T\ h_2^T\ \ldots\ h_M^T]^T \tag{10c}$$

In equation (10b) $E\{\ldots\}$ represents the mathematical expectation operator. According to an embodiment, the estimator unit 120 minimizes the cost function by updating the estimated channel impulse response vector adaptively according to equation (11):

$$\hat{\vec{h}}(n+1) = \frac{\hat{\vec{h}}(n) - 2\mu \tilde{R}(n)\hat{\vec{h}}(n)}{\|\hat{\vec{h}}(n) - 2\mu \tilde{R}(n)\hat{\vec{h}}(n)\|} \tag{11}$$

In equation (11), $\mu$ represents a predefined positive step size parameter. The MCLMS algorithm converges steadily to the desired solution. According to another embodiment, the MCN (multi-channel Newton) algorithm is applied to accelerate the convergence.

Figure 3C:
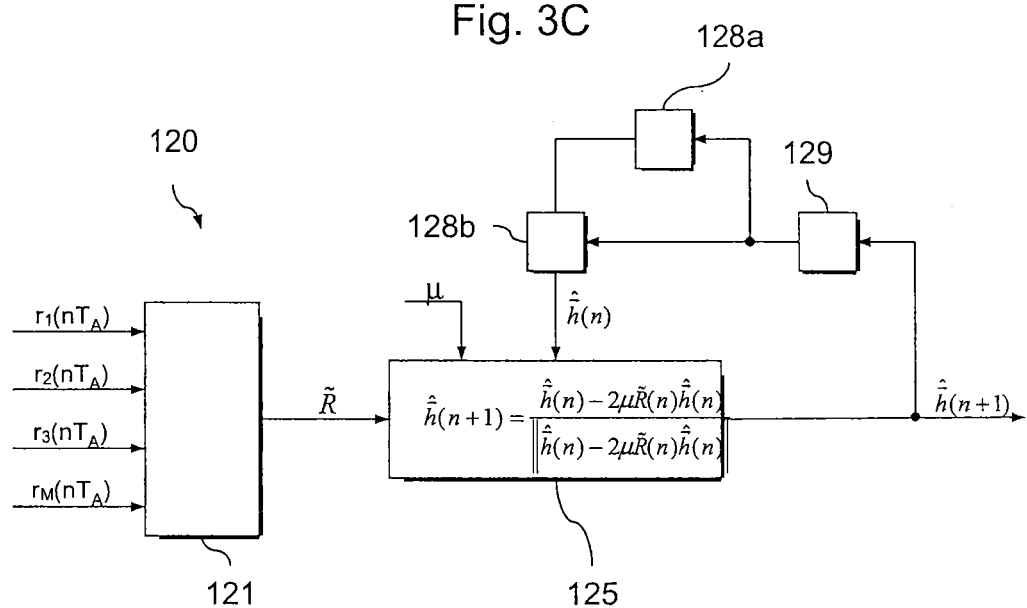
FIG. 3C is a schematic block diagram showing details of an embodiment of the estimator unit of the signal processing unit of FIG. 3B in accordance with an embodiment related to a time-domain oriented definition of an error signal.

FIG. 3C schematically illustrates an embodiment of the estimator unit 120 instantiating the algorithm according to equations (5) to (11). A correlation unit 121 derives autocorrelation and cross-correlation information from the receive signals r(t) and provides information describing a cross-correlation matrix approximation $\tilde{R}$. A storage unit 129 stores the estimated channel impulse response vectors $\hat{\vec{h}}(n)$ obtained from the preceding iteration step. An iteration unit 125 determines the updated estimated channel impulse response vector $\hat{\vec{h}}(n+1)$ from the cross-correlation matrix approximation $\tilde{R}$, the step-size parameter $\mu$ and the previous estimated channel impulse response vector $\hat{\vec{h}}(n)$.

Since no information about s(t) is used, blind diversity combining is independent from the applied transmission standard and can be applied to different transmission systems and standards. Blind diversity combining works with both single-carrier and multi-carrier signals and does not require a redesign of existing demodulators.

Since the estimation unit 120 does not synchronize in time with the receive signals, the receive signal may be sampled at a sample rate (sample frequency) that is higher than an upper frequency limit of the receive signal. For example, the sample rate is twice the upper frequency limit of the receive signal. As a result, the sampled receive signal may also contain portions from outside the receive signal (out-of-band energy). The out-of-band energy increases the number of possibilities for a channel estimate and may lead to a misconvergence of the estimate.

According to an embodiment, the estimator unit 120 may include a detecting unit 128a and a power limiting unit 128b. The detecting unit 128a may detect a misconvergence of the iteration algorithm or a criterion that potentially may result in a misconvergence. For example the detecting unit 128a may evaluate differences between two or more consecutive estimates for the channel vectors. When, at a certain iteration step, the differences between two or more consecutive estimates for the channel vectors exceed a predetermined threshold, the detecting unit 128a may output a control signal indicating a misconvergence to the power limiting unit 128b. According to an embodiment, the detecting unit 128a determines the out-of-band signal energy of the estimated channel vectors and outputs a control signal indicating a potential misconvergence if the determined out-of-band energy exceeds a predetermined threshold. The evaluation of the out-of-band energy may be performed adaptively by using varying thresholds depending on a previously applied threshold and the currently estimated channel vectors.

In response to the control signal, the power limiting unit 128b attenuates higher frequency portions in the estimated channel vectors and the iteration algorithm uses the attenuated estimated channel vectors in the next iteration step. The higher frequency portions are in a frequency range between the upper frequency limit of the receive signal and the sample frequency. According to an embodiment, the power limitation or clipping may be performed iteratively. The power limiting unit 128b may release or successively decrease the attenuation of the higher frequency portions when the detecting unit 128a detects a more convergent behaviour of the iteration algorithm and outputs a corresponding control signal.

The attenuation of the higher frequency portions may start for frequencies just below the sample frequency and may successively proceed to lower frequencies. According to another embodiment, first a small attenuation is applied to nearly all frequency components between the upper frequency edge of the receive signal and the sample frequency and the degree of attenuation is gradually increased. Other embodiments may combine both approaches.

According to an embodiment, the power limiting unit 128b filters the estimated channel vectors by limiting the maximum affordable power for frequency band edge areas of the estimated channel vectors. The power limiting unit 128b may use a DFT or a kind of filtering to obtain the required information and to limit the out-of-band energy. The power limiting unit 128b may be provided in a signal path between the output of the iteration unit 125 and the input of the storage unit 129 or in a signal path between the output of the storage unit 129 and an input of the iteration unit 125.

Figure 3D:
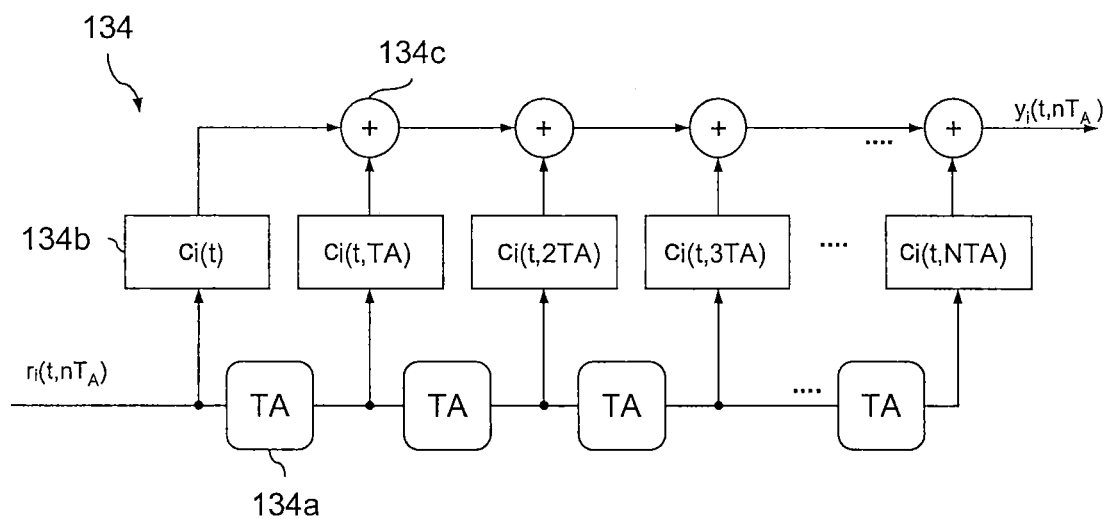
FIG. 3D is a schematic block diagram showing details of an embodiment of the filter unit of the signal processing unit of FIG. 3B.

FIG. 3D refers to details of the filter units 134. Each filter unit 134 may comprise delay units 134a for providing delayed instances of the respective receive signal $r_i(t, n \cdot T_A)$ delayed by multiples of $T_A$. A configurable weighting unit 134b is assigned to each delayed instance, which multiplies the respective instance of the concerned receive signal $r_i(t, n \cdot T_A)$ with the corresponding set of combining coefficients $c_i(t, n T_A)$. The output signals of the weighting units 134b are combined or superposed using summation units 134c to generate the filtered signal $y_i(t, n \cdot T_A)$.

Other embodiments of the estimator unit 120 may provide an iterative estimation of channel vectors $\vec{\underline{h}}_i(m)$ in the frequency domain (channel transfer functions), with the index (i) identifying the channel number.

Figure 3E:
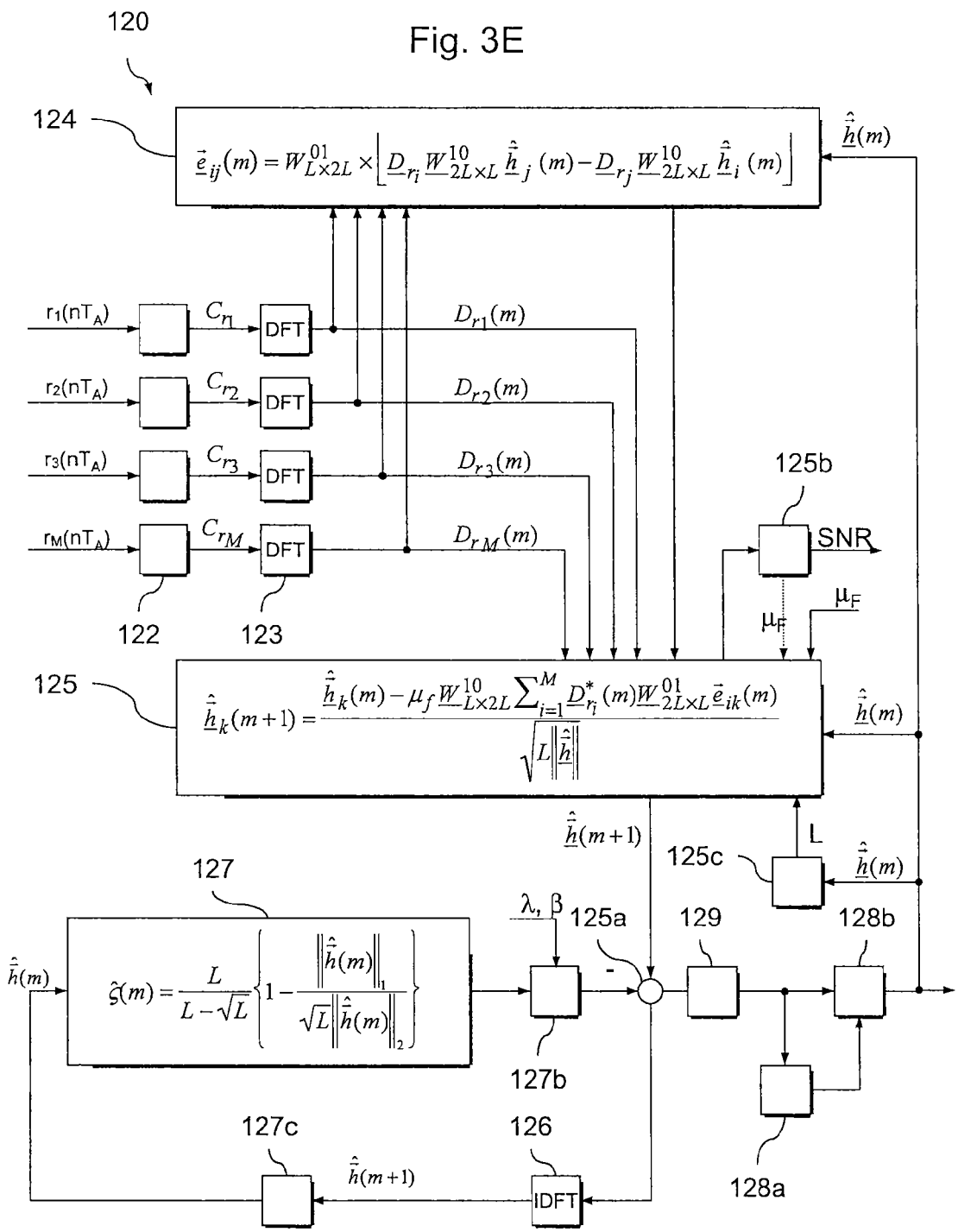
FIG. 3E is a schematic block diagram showing details of an embodiment of the estimator unit of the signal processing unit of FIG. 3B in accordance with an embodiment related to a frequency-domain oriented definition of an error signal.

For example, the estimator unit 120 illustrated in FIG. 3E refers to an embodiment providing the MCFLMS (multi-channel frequency least mean square) algorithm. MCFLMS derives frequency-domain block error sequence vectors $\vec{\underline{e}}_{ij}(m)$ for all M channels on the basis of an overlap-save or overlap-add technique used for frequency-domain filtering. For a current block m of 2L sample values, MCFLMS constructs a frequency-domain mean square error criterion analogously to the above-discussed time-domain approach. Then an iteration algorithm updates the frequency-domain channel vectors $\vec{\underline{h}}_j(m)$ for the next block (m+1).

For applying the overlap-save technique, first a vector $\tilde{\vec{y}}_{ij}(m)$ (i, j=1, 2, . . . , M) of length 2L may be defined that results from the circular convolution of the receive signal vectors $\vec{r}_i$ and the estimated channel impulse response vectors $\hat{\vec{h}}_j$ as given by equations (12), (13), (14), and (15):

$$\tilde{\vec{y}}_{ij}(m) = C_{r_i} \hat{\vec{h}}_j^{10}(m) \tag{12}$$

$$\tilde{\vec{y}}_{ij}(m) = [\tilde{y}_{ij}(mL-L) \tilde{y}_{ij}(mL-L+1) \ldots \tilde{y}_{ij}(mL) \ldots \tilde{y}_{ij}(mL+L-1)]^T \tag{13}$$

$$C_{r_i}(m) = \begin{bmatrix} r_i(mL-L) & r_i(mL+L-1) & \ldots & r_i(mL-L+1) \\ r_i(mL-L+1) & r_i(mL-L) & \ldots & r_i(mL-L+2) \\ \vdots & \vdots & \ddots & \vdots \\ r_i(mL) & r_i(mL-1) & \ldots & r_i(mL+1) \\ \vdots & \vdots & \ddots & \vdots \\ r_i(mL+L-1) & r_i(mL+L-2) & \ldots & r_i(mL-L) \end{bmatrix} \tag{14}$$

$$\hat{\vec{h}}_j^{10}(m) = \begin{bmatrix} \hat{\vec{h}}_j^T(m) & \vec{0}_{L\times 1}^T \end{bmatrix}^T \tag{15}$$

$$= [\hat{h}_{j,0}(m) \; \hat{h}_{j,1}(m) \; \ldots \; \hat{h}_{j,L-1}(m) \; 0 \; \ldots \; 0]^T$$

With equation (12), the last L values from $\tilde{y}_{ij}(mL)$ to $\tilde{y}_{ij}(mL+L-1)$ are identical to the results of a linear convolution as given by equation (16):

$$\vec{y}_{ij}(m) = W_{L\times 2L}^{01} \tilde{\vec{y}}_{ij}(m) = W_{L\times 2L}^{01} C_{r_i} \hat{\vec{h}}_j^{10}(m) = W_{L\times 2L}^{01} C_{r_i} W_{2L\times L}^{10} \hat{\vec{h}}_j(m) \tag{16}$$

with $$\vec{y}_{ij}(m) = [y_{ij}(mL) y_{ij}(mL+1) \ldots y_{ij}(mL+L-1)]^T$$

$$W_{L\times 2L}^{01} = [0_{L\times L} I_{L\times L}]$$

$$W_{2L\times L}^{10} = [I_{L\times L} 0_{L\times L}]^T$$

$$\hat{\vec{h}}_j(m) = [\hat{h}_{j,0}(m) \hat{h}_{j,1}(m) \ldots \hat{h}_{j,L-1}(m)]^T$$

In equation (16), $\hat{\vec{h}}_j(m)$ is the estimated channel vector in the frequency domain for the j-th channel. The W matrices are used to realize the zero padding and masking for the overlap-save technique. In particular, utilizing the overlap-save technique, the input data blocks are overlapped by L points. For each block of length L, where 2L data inputs are available, the first L circular convolution results are discarded and the last L convolution results are retained as outputs. Equation (16) can be used to define a time-domain block error signal vector $\vec{e}_{ij}(m)$ between the i-th and the j-th channels for the m-th block on the basis of the respective $C_{r_i}$ matrices:

$$\vec{e}_{ij}(m) = \vec{y}_{ij}(m) - \vec{y}_{ji}(m) = W_{L\times 2L}^{01} [C_{r_i} W_{2L\times L}^{10} \hat{\vec{h}}_j(m) - C_{r_j} W_{2L\times L}^{10} \hat{\vec{h}}_i(m)] \tag{17}$$

In equation (17) $C_{r_i}$ and $C_{r_j}$ are circulant matrices. The MCFLMS approach exploits the fact that $C_{r_i}$ can be decomposed in a diagonal matrix $D_{r_i}$ in the frequency domain using equation (18), with $F_{2L\times 2L}$ being the Fourier transform matrix of size 2L×2L:

$$C_{r_i}(m) = F_{2L\times 2L}^{-1} \underline{D}_{r_i}(m) F_{2L\times 2L} \qquad (18)$$

With equation (18) it can be shown that frequency-domain block error sequence vectors $\vec{\underline{e}}_{ij}(m)$ can be used in the iteration step instead of the time-domain block error signal vectors $\vec{e}_{ij}(m)$. To this purpose, the frequency-domain block error sequence vectors $\vec{\underline{e}}_{ij}(m)$ are defined as the Fourier transformed of the time-domain block error signal vectors $\vec{e}_{ij}(m)$ by multiplying the time-domain block error signal vectors $\vec{e}_{ij}(m)$ with a Fourier matrix of size L×L according to equation (19):

$$\vec{\underline{e}}_{ij}(m) = F_{L\times L}\vec{e}_{ij}(m) \qquad (19)$$

Inserting equation (17) in equation (19) and then applying equation (18) gives equation (20):

$$\vec{\underline{e}}_{ij}(m) = W_{L\times 2L}^{01}\times [\underline{D}_{r_i}\underline{W}_{2L\times L}^{10}\hat{\vec{\underline{h}}}_j(m) - \underline{D}_{r_j}$$
$$W_{2L\times L}^{10}\hat{\vec{\underline{h}}}_i(m)] \qquad (20)$$

Due to the nature of the diagonal matrix $D_{r_j}$ the computational burden to obtain the frequency-domain block error sequence vectors $\vec{\underline{e}}_{ij}(m)$ is low compared to that required to obtain the time-domain block error signal vectors $\vec{e}_{ij}(m)$, such that in the frequency domain a fewer number of multiplications replaces the higher number of multiplications in the computationally intensive convolution of the i-th receive signal $r_i(n)$ and the impulse response $\vec{h}_j(n)$ of the j-th channel estimation, which is required for the calculation of the time-domain block error signal vectors $\vec{e}_{ij}(m)$ according to equation (7). Then a frequency-domain mean square error criterion for the m-th block is constructed analogously to the time-domain approach. From the error criterion, the frequency-domain LMS algorithm updates the frequency-domain channel vectors for the (m+1)-th block from the frequency-domain channel vectors of the m-th block according to equations (21), (22), and (23):

$$\hat{\vec{\underline{h}}}_k(m+1) = \frac{\hat{\vec{\underline{h}}}_k(m) - \mu_f \underline{W}_{L\times 2L}^{10}\sum_{i=1}^{M}\underline{D}_{r_i}^*(m)\underline{W}_{2L\times L}^{01}\vec{\underline{e}}_{iK}(m)}{\sqrt{L\|\hat{\underline{h}}\|}} \qquad (21)$$

$$k = 1, 2, \ldots, M$$

$$\underline{W}_{L\times 2L}^{10} = F_{L\times L}[\ I_{L\times L}\ \ 0_{L\times L}\ ]F_{2L\times 2L}^{-1} = \frac{1}{2}(\underline{W}_{2L\times L}^{10})^H \qquad (22)$$

$$\underline{W}_{2L\times L}^{01} = F_{2L\times 2L}[\ 0_{L\times L}\ \ I_{L\times L}\ ]^T F_{L\times L}^{-1} = \frac{1}{2}(\underline{W}_{L\times 2L}^{01})^H \qquad (23)$$

In FIG. 3E, the estimator unit 120 includes register units 122 to provide, for each receive path, 2L sampled values of the receive signals in appropriate form to discrete Fourier transform units 123. The Fourier transform units 123 output the respective diagonal matrices to an error calculator unit 124. The error calculator unit 124 uses an overlap-save approach to determine a frequency-domain block error sequence vector using the Diagonal matrices and the previously obtained estimated frequency domain channel vector. The error calculator unit 124 outputs the frequency-domain block error sequence vector to an iteration unit 125. The iteration unit 125 updates the estimated frequency-domain channel vectors on the basis of the previously obtained estimated frequency-domain channel vectors, the updated frequency-domain block error sequence vector, the Diagonal matrices and a predefined step size parameter $\mu_F$. A storage unit 129 stores the updated estimated frequency-domain channel vectors $\hat{\vec{\underline{h}}}$ for the next iteration step. An inverse transformation unit 126 applies an inverse discrete Fourier transform to obtain the updated time-domain channel impulse response vectors $\hat{\vec{h}}_i$. According to other embodiments, the estimator unit 120 includes further sub-units to perform a MCNFLMS (multi-channel normalized frequency least mean square) algorithm.

According to an embodiment, the estimator unit 120 comprises a sparseness evaluation unit 127 and an adjustment unit 125a. The sparseness evaluation unit 127 estimates a sparseness measure $\hat{\varsigma}(n)$ on the basis of the estimated channel impulse response vectors $\hat{\vec{h}}$. The adjustment unit 124a modifies the estimated channel impulse response vectors $\hat{\vec{h}}$ on the basis of the sparseness measure in a way that channel sparseness of the estimated channels is increased.

In general, sparseness measures give the degree of sparseness for an impulse response, wherein impulse responses that concentrate in few coefficients are sparser and less dispersive than impulse responses that distribute over more coefficients. Usually a channel is the sparser the fewer non-zero channel coefficients the channel has. The sparseness measure may be any sparseness measure published in the context of transmission channel sparseness. According to an embodiment, the sparseness measure $\hat{\varsigma}(n)$ is given by equation (24):

$$\hat{\varsigma}(n) = \frac{L}{L - \sqrt{L}}\left\{1 - \frac{\|\hat{\vec{h}}(n)\|_1}{\sqrt{L}\|\hat{\vec{h}}(n)\|_2}\right\} \qquad (24)$$

with $0 \leq \hat{\varsigma}(n) \leq 1$. A low value for $\hat{\varsigma}(n)$ indicates a nearly dispersive channel and a value close to 1 indicates a sparse channel. With the sparseness measure as defined in equation (24) blind diversity combining schemes yield more reliable results.

The sparseness evaluation unit 127 may use time-domain impulse responses obtained by inverse Fourier transformation of the delayed (stored) estimated frequency-domain channel vectors. According to the illustrated embodiment, a second storage unit 127c delays or stores the updated time-domain channel impulse response vectors obtained by the inverse transformation unit 126 and supplies them to the sparseness evaluation unit 127c.

The adjustment unit 125a adjusts the estimated frequency-domain channel vectors on the basis of the obtained sparseness measure. For example, the adjustment unit 125a reduces the estimated frequency-domain channel vectors within the iteration loop by an amount defined by an adjustment term derived from the obtained sparseness measure.

The adjustment unit 125a may modify the updated estimated frequency-domain channel vectors on the basis of an adjustment term that increases the sparseness of the estimation with ongoing iterations, thereby exploiting the fact that for many applications real transmission channels appear sparser than their estimates. For example, in real broadcast transmission obstacles reflect the transmission signals. As a result, various delayed versions of the transmission signal superpose each other at the receiver side. Each reflection of the real transmission signal corresponds to a high coefficient value in the channel impulse response at a time point given by the position of the obstacle. It can be observed that impulse responses for real transmission channels often contain only few strong coefficients resulting from reflections, whereas the impulse responses are flat and near zero in the rest.

The adjustment term may or may not consider previous channel estimations. According to an embodiment, the adjustment term considers both the sparseness measure and at least the previously estimated channel impulse response vectors.

An example is given in equations (25), (25a) and (25b), wherein the adjustment term contains an adjustment parameter $\lambda_k$ derived from the sparseness measure $\hat{\varsigma}$ (n).

$$\hat{\tilde{h}}_k(m+1) = \hat{\tilde{h}}(m+1) - \lambda_k \hat{\tilde{h}}_k^\in \tag{25}$$

$$\hat{\tilde{h}}_k = \frac{\partial \left\|\hat{\tilde{h}}_k(n)\right\|_p^p}{\partial \hat{\tilde{h}}_k} \tag{25a}$$

$$\tilde{h}_k^\in(i) = p \cdot \mathrm{sign}(\hat{\tilde{h}}_k(i)) \cdot (\hat{\tilde{h}}_k(i) + \in)^{p-1} ; \tag{25b}$$
$$1 = 1, \ldots, M(L+1)$$

In general, the adjustment unit 125a may modify the updated estimated frequency-domain channel vectors such that for each transmission channel the sum of the channel impulse response coefficients is minimized and at the same time an energy represented by the respective transmission channel impulse response is maintained.

The adjustment parameter $\lambda_k$ is derived from the current sparseness measure such that an unwanted error floor can be avoided. The derivation of the adjustment parameter $\lambda_k$ from the sparseness measure may depend on various constraints such as the assumed sparseness of the real transmission channel.

According to an embodiment, on the basis of the sparseness measure a differentiator unit 127b may provide the adjustment parameter $\lambda_k$ such that the adjustment term in equation (25) is relevant only as long as the algorithm has not sufficiently converged to the desired solution. For example, the adjustment parameter $\lambda_k$ is selected to represent an approximation of the differential of the sparseness measure with respect to the iterations. According to an embodiment, the differentiator unit 127b sets the adjustment parameter $\lambda_k$ according to equation (26):

$$\lambda_k(n) = \gamma \cdot |\hat{\varsigma}(n) - \hat{\varsigma}(n-1)| \tag{26}$$

Usually, at the beginning of the estimation the sparseness measure varies by a large value until it converges to a certain value. Then, in the case of a static channel, the sparseness measure stays nearly constant. For time-varying channels, the sparseness measure varies only by a small amount after the initial phase. Hence, equation (26) ensures that the adjustment term is active only as long as it is useful during estimation. For example, for a static channel the weight is continuously decreased, whereas each channel change triggers an increase of the weight. The constant $\gamma$ may be selected according to application constraints.

According to another embodiment, the adjustment parameter $\lambda_k$ is defined on the basis of an averaged time derivative of the sparseness measure. For example, the adjustment parameter $\lambda_k$ is defined as in equations (27a), (27b):

$$\lambda_1(n) = \gamma \cdot |\hat{\varsigma}(n) - \hat{\varsigma}(n-1)| \tag{27a}$$

$$\lambda_k(n) = \beta \lambda_1(n) + (1-\beta) \lambda_1(n-1) \tag{27b}$$

In equation (27b) a forgetting factor $\beta$ gives the weight of the current adjustment parameter $\lambda_k$ with regard to that of the previous iteration and allows control of the short-time averaging in a way to remove the influence of noise. The forgetting factor $\beta$ can be set according to the application or can be adapted to current noise conditions.

Figure 3F:
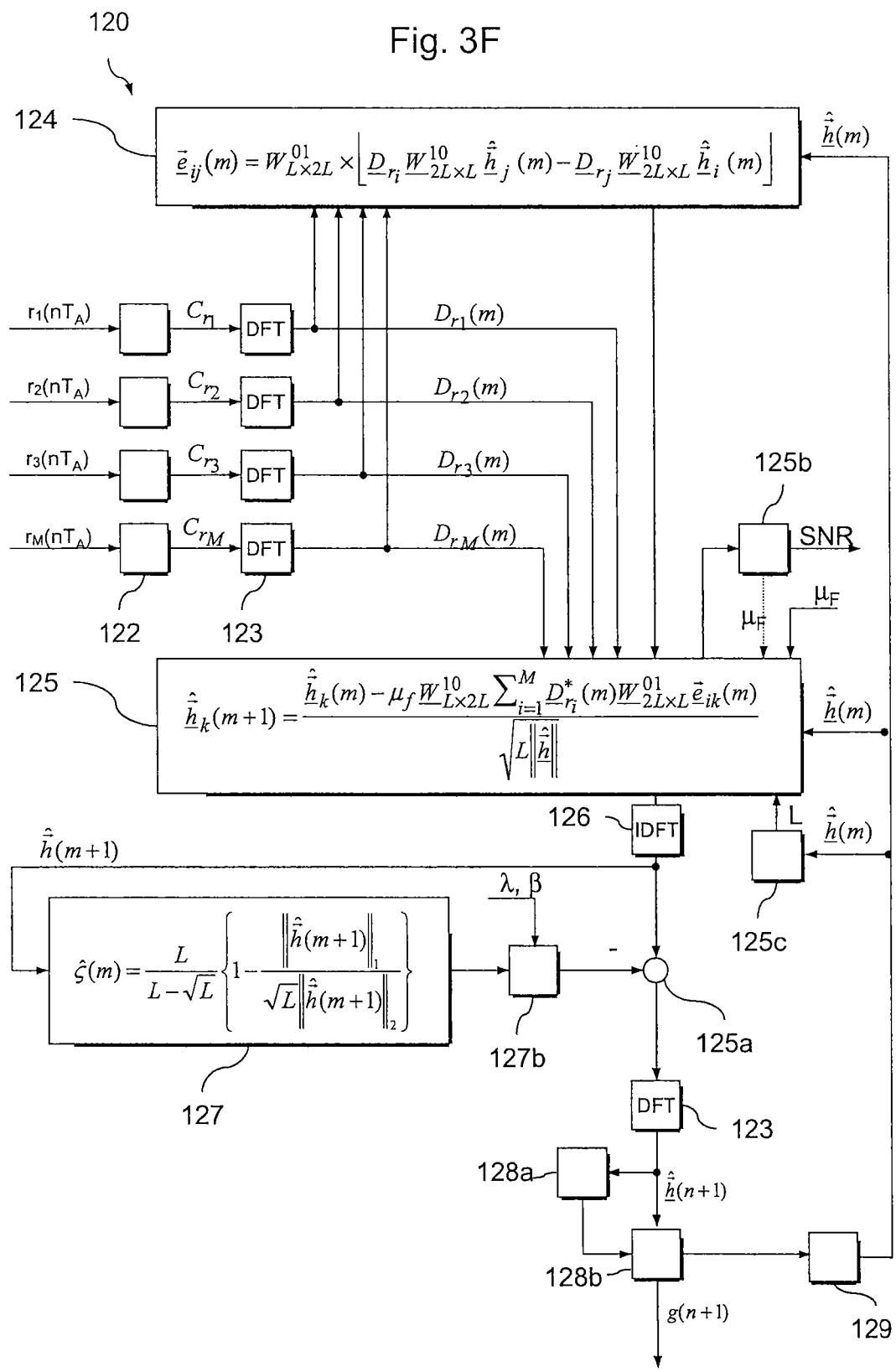
FIG. 3F is a schematic block diagram showing details of another embodiment of the estimator unit of the signal processing unit of FIG. 3B in accordance with an embodiment related to a frequency-domain oriented definition of an error signal.

While FIG. 3E shows an example of the configuration of the sub-units of the estimator unit 120, other embodiments may provide other configurations. For example, the embodiment of FIG. 3F provides an inverse transformation unit 126 providing an inverse discrete Fourier at the output of the iteration unit 125 and supplies the time-domain impulse response vectors output by the iteration unit 125 to the sparseness evaluation unit 127. The modification takes place in the time-domain. An additional transformation unit 123 applies a discrete Fourier transform unit 123 on the modified impulse response vectors to obtain modified frequency-domain channel vectors. The frequency-domain channel vectors are supplied for the next iteration step. With the embodiment of FIG. 3F each iteration step is based on the sparseness measure of the channel vectors of the preceding iteration step.

Figure 4:
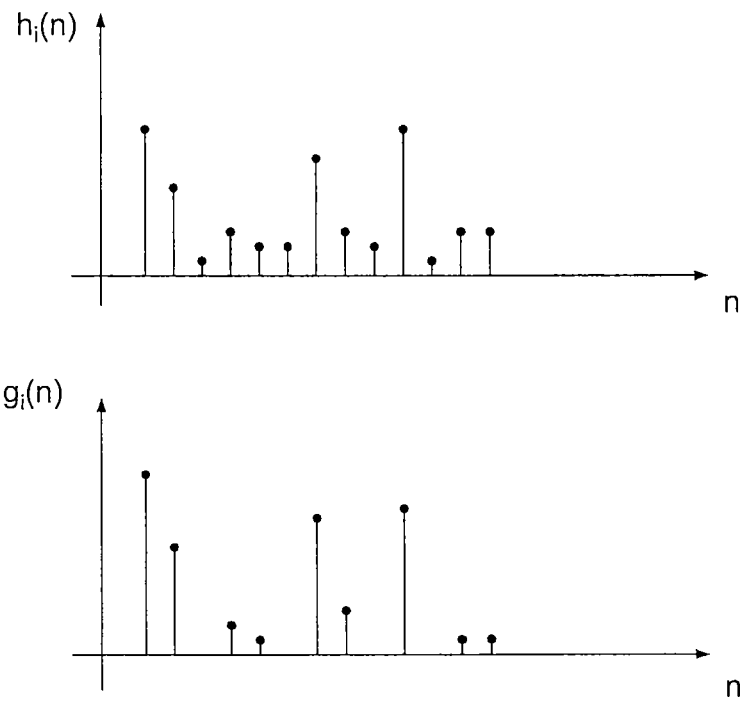
FIG. 4 shows diagrams illustrating the effect of increasing sparseness of a channel estimation.

The diagram in the upper half of FIG. 4 shows an estimated channel impulse response for an algorithm that does not consider sparseness. The diagram in the lower half of FIG. 4 visualizes the effect of an algorithm according to the embodiments aiming at increasing the sparseness of the channel estimation under the assumption that the real transmission channel shows high sparseness. The diagrams are for illustrative purposes only and do not reproduce actual measurement or simulation results.

Since the estimation unit 120 does not synchronize in time with the receive signals, the receive signal may be sampled at a sample rate (sample frequency) that is higher than an upper frequency limit of the receive signal, i.e. the receive signal is oversampled. For example, the sample rate is twice the upper frequency limit of the receive signal. As a result, the sampled receive signal may also contain portions from outside the receive signal representing out-of-band energy. The out-of-band energy is assigned to a frequency range between the upper frequency limit of the receive signal and the sample frequency. The out-of-band energy increases the number of possibilities for a channel estimate and may lead to a misconvergence of the estimate. Applying an iteration algorithm that modifies the cost function using a term that is continuously adapted to the channel behaviour reduces the number of possibilities for the channel estimates and results in a more convergent behaviour of the iteration algorithm.

According to an embodiment, the estimator unit 120 may further include a detecting unit 128a and a power limiting unit 128b. The detecting unit 128a may detect a misconvergence of the iteration algorithm or a criterion that potentially may result in a misconvergence. For example the detecting unit 128a may evaluate differences between two or more consecutive estimates for the channel vectors. When at a certain iteration step the differences between two or more consecutive estimates for the channel vectors exceed a predetermined threshold, the detecting unit 128a may output a control signal indicating a misconvergence to the power limiting unit 128b. According to an embodiment, the detecting unit 128a determines the out-of-band signal energy of the estimated channel vectors and outputs a control signal indicating a potential misconvergence if the determined out-of-band energy exceeds a predetermined threshold. The evaluation of the out-of-band energy may be performed adaptively by using varying thresholds depending on a previously applied threshold and the currently estimated channel vectors.

In response to the control signal, the power limiting unit 128b may attenuate the out-of-band frequency portions in the estimated channel vectors and the iteration algorithm continues with the attenuated estimated channel vectors in the next iteration step. The out-of-band frequency portions are portions in a frequency range between the upper frequency limit of the receive signal and the sample frequency. According to an embodiment, the power limitation or clipping may be performed iteratively. The power limiting unit 128b may release or successively decrease the attenuation of the higher frequency portions when the detecting unit 128a detects a more convergent behaviour of the iteration algorithm and outputs a corresponding control signal.

The attenuation of the higher frequency portions may start for frequencies just below the sample frequency and may successively proceed to lower frequencies. According to another embodiment, first a small attenuation is applied to nearly all frequency components between the upper frequency edge of the receive signal and the sample frequency and the degree of attenuation is gradually increased. Other embodiments may combine both approaches. The power limiting unit 128b may be provided in a signal path between an output of the iteration unit 125 and an input of the storage unit 129 or in a signal path between an output of the storage unit 129 and inputs of the iteration and error calculator units 125, 124.

According to an embodiment, the detecting unit 128a determines an out-of-band energy of the estimated frequency-domain channel vectors. When the determined energy exceeds a predefined threshold, the detecting unit 128a outputs a control signal to the power limiting unit 128b. In response to the control signal the power limiting unit 128b limits/clips the power used for the estimate in the oversampled areas in order to control the estimation process in these areas to obtain power-limited estimated channel vectors. Applying a power limitation in the out-of-band areas reduces the number of possibilities for the channel estimates and results in a more convergent behaviour of the iteration algorithm.

According to a further embodiment, the estimator unit 120 includes an SNR unit 125b that outputs SNR information descriptive for current signal-to-noise ratio values of the channels. The inventors could observe a linear relationship between the cost function in logarithmic scale and the SNR value for small SNR values up to about 30 dB when the cost function has converged. Since wireless communications provides low transmission power and deals with missing line of sight, fading and other distortions, typically a low SNR below 30 dB is observed at the receiver side. Hence the linearity between the converged cost function and the SNR as given in equation (28) is applicable for many applications.

$$SNR = -10 \cdot \log_{10}(J) - \sigma \qquad (28)$$

In equation (28) σ is a constant offset of about 8 to 10 dB, typically about 9 dB. The SNR unit 125b may output the SNR information to further sub-units of the signal processing unit 120, for example to a demodulator unit for further equalizing the combined signal. According to another embodiment, the SNR information is used to adapt the step size parameter μF for the iteration algorithm or to generate a control signal to select a diversity selection scheme in a diversity combining unit.

According to a further embodiment, a window adjustment unit 125c measures a CBW (coherence bandwidth) of the current estimated channel transfer functions and adjusts the observation window length L for the iteration algorithm, which is, by way of example, a MCFLMS or MCNFLMS (multi-channel normalized frequency least mean squares) algorithm, to keep the window length as small as possible. The window adjustment unit 125c may estimate the CBW (coherence bandwidth) by convolution of each current estimated channel transfer functions. The window adjustment unit 125c may increase the window length L when the measured CBW appears to be limited by the observation window. The window adjustment unit 125c may decrease the window length L when the measured CBW appears to be notably larger than the observation window theoretically allows. Adjusting the observation window length mitigates both potential channel order overestimation and loss of orthogonality in case of fast-fading channels.

According to a further embodiment, the window adjustment unit 125c measures a CT (channel coherence time) on the basis of the previous estimated channel transfer functions and adjusts the observation window length L accordingly. The window adjustment unit 125c may decrease the window length L when the measured CT appears to be notably shorter than the observation window. The window adjustment unit 125c may increase the window length L when the measured CT appears to be notably larger than the observation window. Where the CBW and the CT estimation results lead to contradictory results for the observation window length L, the window adjustment unit 125c adjusts the observation window length L such that the overall system performance is optimized, e.g. a BER (bit error rate) is minimized.

The signal processing unit 120 may use the results for the estimated channel order (observation window length) for adjusting the computational complexity, for example by frequency-domain sub-sampling where the process is performed only every pth frequency tap with p>1 or by time-domain sub-sampling, where the process is performed only every qth signal block with observation window length L and q>1, wherein p and/or q are selected proportional to the estimated channel order, by way of example.

The signal processing unit 100 of the above-described embodiments and each of its sub-units may be realized in hardware, in software or as a combination thereof. Some or all of the sub-units of the signal processing unit 100 may be integrated in a common package, for example in an IC (integrated circuit), an ASIC (application specific circuit) or a DSP (digital signal processor).

Figure 5:
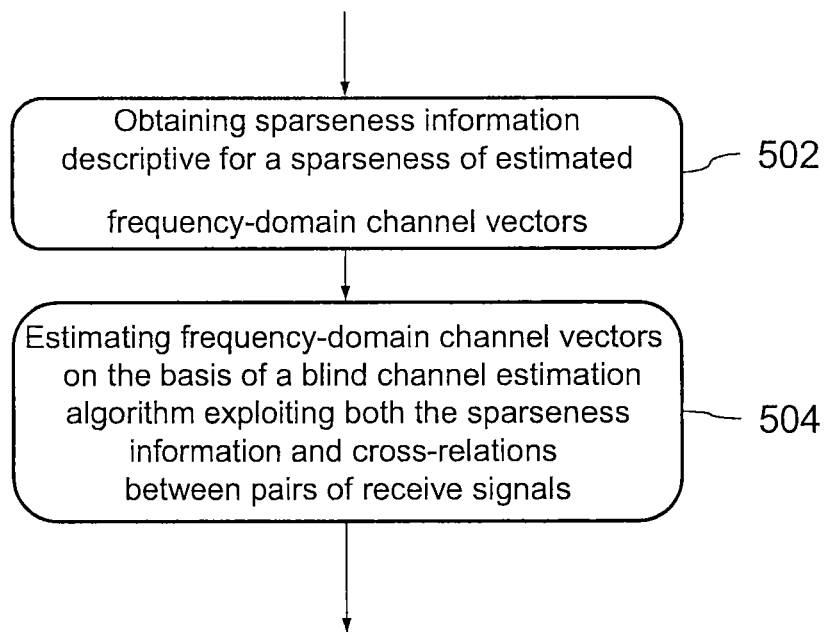
FIG. 5 is a simplified flow-chart of a method of operating a receiver apparatus using diversity combining in accordance with a further embodiment.

FIG. 5 refers to a method of operating a receiver apparatus. On the basis of previous estimated frequency-domain channel vectors, sparseness information is obtained that is descriptive for a change of sparseness in the estimated frequency-domain channel vectors (502). From the sparseness information and a plurality of receive signals, estimates for frequency-domain channel vectors of transmission channels are updated on the basis of a blind channel estimation algorithm exploiting both the sparseness information and cross-relations between pairs of receive signals (504). Thereby each receive signal is assigned to another one of the transmission channels and all receive signals originate from the same transmit signal.

A further embodiment refers to a signal processing unit that includes an estimator unit, a detecting unit and a power limiting unit. The estimator unit estimates, from a plurality of receive signals, frequency-domain channel vectors of transmission channels on the basis of an iterative blind channel estimation algorithm exploiting cross-relations between pairs of receive signals, wherein each receive signal is assigned to another one of the transmission channels and originates from the same transmit signal. The detecting unit detects, on the basis of the frequency-domain channel vectors, a misconvergence behaviour of the blind channel estimation algorithm or an excess condition for out-of-band energy in a frequency range between an upper frequency limit of the receive signal and a sample frequency and outputs a control signal indicating a misconvergence behaviour or an excess condition. The power limiting unit limits a signal energy in a frequency band edge area of the frequency-domain channel vectors in response to the control signal. The power limiting unit may limit the signal energy in the frequency band edge area adaptively in response to currently and/or previously estimated frequency-domain channel vectors, wherein the blind channel estimation algorithm proceeds with the energy-limited estimated frequency-domain channel vectors. The blind channel estimation algorithm is improved, whether or not the blind channel estimation algorithm uses sparseness information concerning a change of sparseness in the estimated channel.

A further embodiment refers to a signal processing unit that includes an estimator unit and an SNR unit. The estimator unit estimates from a plurality of receive signals, frequency-domain channel vectors of transmission channels on the basis of an iterative blind channel estimation algorithm exploiting cross-relations between pairs of receive signals, wherein each receive signal is assigned to another one of the transmission channels and originates from the same transmit signal. The SNR unit outputs SNR information descriptive for current signal-to-noise ratio values of the channels on the basis of the values of a cost function minimized by the iterative blind channel estimation algorithm. The SNR unit may adjust a predefined step size parameter of the blind channel estimation algorithm on the basis of the values of the cost function. The blind channel estimation algorithm is improved, whether or not the blind channel estimation algorithm uses sparseness information.

Each of the above embodiments improves existing blind channel estimation algorithms. In combination with diversity combining, where state-of-the-art receiver diversity techniques are based on partial knowledge of the channel transfer function and therefore require a demodulator to be instantiated for each receive signal, the described embodiments may solve this short-coming by means of realizing blind diversity combining before demodulation. The "blind" diversity combining exploits the fact that the knowledge of cross-relations between the channels suffices to apply diversity combining at a profit. The approach can be applied to a wide range of communication systems. Costs for diversity receivers can be significantly reduced.

CROSS-REFERENCE TO RELATED APPLICATIONS

The present application claims priority of EP patent application No. 12 001 057.4 filed on 17 Feb. 2012 and EP patent application No. 12001058.2 filed on 17 Feb. 2012, the entire contents of which are incorporated herein by reference.

The invention claimed is:

1. A signal processor comprising:
 circuitry configured to
 receive a plurality of receive signals, and
 estimate, from the plurality of receive signals, frequency-domain channel vectors of transmission channels based on an iterative blind channel estimation algorithm, which exploits cross-relations between pairs of the receive signals and which is modified by a term considering a change in a sparseness measure obtained from the estimated frequency-domain channel vectors,
 wherein each said receive signal is assigned to another one of the transmission channels and originates from a same transmit signal.

2. The signal processor of claim 1, wherein
the circuitry is further configured to combine the receive signals based on combining coefficients derived from the estimated frequency-domain channel vectors to obtain a combined receive signal representing an estimation of the transmit signal transmitted through the transmission channels.

3. The signal processor of claim 2, wherein
the circuitry is further configured to apply maximum ratio combining by determining, from the estimated frequency-domain channel vectors or time-domain channel impulse response vectors derived therefrom, filter coefficients for matched filters, each said matched filter matching with the estimated time-domain channel impulse response of one of the transmission channels.

4. The signal processor of claim 1,
wherein the circuitry is further configured to estimate the frequency-domain channel vectors based on an iterative algorithm that minimizes a cost function, and
wherein the iterative algorithm updates the frequency-domain channel vectors based on previous frequency-domain channel vectors, a predefined step size parameter, a current block error sequence vector and a current sparseness measure indicating a change in sparseness in the estimated channel vectors.

5. The signal processor of claim 4, wherein
the current block error sequence vector represents a Fourier-transformed of block error signals between pairs of the receive signals, each said block error signal resulting from a deviation between a result of a convolution of one of the receive signals received through a first transmission channel with an estimated impulse response of a second transmission channel and a result of a convolution of another of the receive signals received through the second transmission channel with an estimated impulse response of the first transmission channel, the iterative algorithm using second-order cross-correlation information about the pairs of the receive signals.

6. The signal processor of claim 1, wherein the circuitry is further configured to
 obtain the sparseness measure, which contains sparseness information for the estimated frequency-domain channel vectors, and
 adjust the estimated frequency-domain channel vectors based on an adjustment term containing the obtained sparseness measure.

7. The signal processor of claim 4, wherein
the iterative algorithm adjusts the updated estimated frequency-domain channel vectors to increase the sparseness measure.

8. The signal processor of claim 4, wherein
the iterative algorithm adjusts the updated estimated frequency-domain channel vectors based on an averaged time derivative of the sparseness measure.

9. The signal processor of claim 4, wherein
the iterative algorithm adjusts the updated estimated frequency-domain channel vectors such that for each said frequency-domain channel vector a sum of channel coefficients is minimized and a signal energy for each said frequency-domain channel vector is maintained.

10. The signal processor of claim 4, wherein
the circuitry is further configured to output Signal-to-Noise Ratio (SNR) information descriptive for current signal-to-noise ratio values of the transmission channels based on the values of the cost function.

11. The signal processor of claim 10, wherein
the circuitry is further configured to adjust a predefined step size parameter based on the values of the cost function.

12. The signal processor of claim 11, wherein
the circuitry is further configured to
detect, based on the frequency-domain channel vectors, a misconvergence behavior of the iterative blind channel estimation algorithm or an excess condition for out-of-band energy in a frequency range between an upper frequency limit of the receive signal and a sample frequency, and
output a control signal indicating the misconvergence behavior or the excess condition.

13. The signal processor of claim 12,
wherein the circuitry is further configured to limit a signal energy in frequency band edge areas of the estimated frequency-domain channel vectors in response to the control signal, and
wherein the iterative blind channel estimation algorithm proceeds with the energy-limited estimated frequency-domain channel vectors.

14. The signal processor of claim 1, wherein
the circuitry is further configured to
measure a coherence bandwidth of the estimated frequency-domain channel vectors, and
adjust an observation window length for the iterative blind channel estimation algorithm based on the measured coherence bandwidths.

15. The signal processor of claim 14, wherein
the circuitry is further configured to
increase the observation window length when the measured coherence bandwidth is limited by the observation window, and
decrease the observation window length when the measured coherence bandwidth is larger than the observation window allows.

16. The signal processor of claim 14, wherein
the circuitry is further configured to
measure a channel coherence time based on previous estimated frequency-domain channel vectors, and
adjust the observation window length based on the measured channel coherence time.

17. The signal processor of claim 16, wherein
the circuitry is further configured to
decrease the observation window length when the measured channel coherence time appears to be shorter than the observation window, and
increase the observation window length when the measured channel coherence time appears to be larger than the observation window.

18. An integrated circuit comprising the signal processor according to claim 1.

19. An electronic device comprising:
the signal processor according to claim 1; and
a plurality of tuner circuits, each said tuner circuit being configured to tune to a carrier frequency of the transmission signal and to output an analog receive signal,
wherein each said analog receive signal is assigned to one of the transmission channels.

20. A method of operating a receiver apparatus, the method comprising:
obtaining, based on previous estimated frequency-domain channel vectors, a sparseness measure containing information descriptive for a sparseness of the previous estimated frequency-domain channel vectors using circuitry of the receiver apparatus; and
estimating, using the circuitry of the receiver apparatus, from a plurality of receive signals, current frequency-domain channel vectors of transmission channels based on an iterative blind channel estimation algorithm exploiting cross-relations between pairs of the receive signals,
wherein the iterative blind channel estimation algorithm is modified based on a change of the sparseness measure obtained from the estimated frequency-domain channel vectors, and
wherein each said receive signal is assigned to another one of the transmission channels and originates from a same transmit signal.

21. The method according to claim 20, further comprising:
combining, using the circuitry of the receiver apparatus, the receive signals based on combining coefficients derived from the estimated frequency-domain channel vectors to obtain a combined receive signal representing an estimation of the transmit signal transmitted through the transmission channels.

22. The method according to claim 21, wherein said combining includes:
determining, from the estimated frequency-domain channel vectors or time-domain channel impulse response vectors derived therefrom, filter coefficients for matched filters, each said matched filter matching with the estimated channel impulse response of one of the transmission channels; and
applying a maximum ratio combining scheme on the receive signals.

23. The method according to claim 20, wherein
said estimating the frequency-domain channel vectors includes applying an iterative algorithm minimizing a cost function,
wherein the iterative algorithm provides updating the frequency-domain channel vectors based on a current frequency-domain channel vector, a predefined step size parameter, a current block error sequence vector and a current sparseness measure.

24. The method according to claim 23,
wherein the current block error sequence vector represents a Fourier-transformed of block error signals between pairs of the receive signals, each said error signal resulting from a deviation between a result of a convolution of one of the receive signals received through a first transmission channel with an estimated impulse response of a second transmission channel and a result of a convolution of another of the receive signals received through the second transmission channel with an estimated impulse response of the first transmission channel, and
wherein the iterative algorithm uses second-order stochastic cross-correlation information about pairs of the receive signals.

25. The method according to claim 20,
wherein the sparseness measure is obtained using sparseness evaluation circuitry that evaluates the sparseness measure based on the estimated frequency-domain channel vectors, and
wherein the estimated frequency-domain channel vectors are adjusted, before a next iteration, based on an adjustment term containing the obtained sparseness measure.

26. A signal processing system comprising:
- estimator circuitry configured to estimate, from a plurality of receive signals, frequency-domain channel vectors of transmission channels based on an iterative blind channel estimation algorithm exploiting cross-relations between pairs of the receive signals, each said receive signal being assigned to another one of the transmission channels and originating from a same transmit signal;
- detecting circuitry configured to detect, based on the frequency-domain channel vectors, a misconvergence behavior of the iterative blind channel estimation algorithm or an excess condition for out-of-band energy in a frequency range between an upper frequency limit of the receive signal and a sample frequency and to output a control signal indicating the misconvergence behavior or the excess condition; and
- power limiting circuitry configured to limit a signal energy in frequency band edge areas of the frequency-domain channel vectors in response to the control signal, wherein the iterative blind channel estimation algorithm proceeds with the energy-limited estimated frequency-domain channel vectors.

27. A signal processing system comprising:
- estimator circuitry configured to estimate, from a plurality of receive signals, frequency-domain channel vectors of transmission channels based on a blind channel estimation algorithm exploiting cross-relations between pairs of the receive signals, each said receive signal being assigned to another one of the transmission channels and originating from a same transmit signal; and
- Signal-to-Noise Ratio (SNR) circuitry configured to output SNR information descriptive for current signal-to-noise ratio values of the transmission channels based on values of a cost function minimized by the blind channel estimation algorithm.

* * * * *